United States Patent
Legzdins

(10) Patent No.: US 9,440,866 B2
(45) Date of Patent: Sep. 13, 2016

(54) EFFICIENT TREATMENT OF WASTEWATER USING ELECTROCHEMICAL CELL

(75) Inventor: Colleen Legzdins, West Vancouver (CA)

(73) Assignee: Axine Water Technologies, Vancouver (CA)

( * ) Notice: Subject to any disclaimer, the term of this patent is extended or adjusted under 35 U.S.C. 154(b) by 223 days.

(21) Appl. No.: 14/124,176

(22) PCT Filed: May 29, 2012

(86) PCT No.: PCT/CA2012/050355
§ 371 (c)(1),
(2), (4) Date: Feb. 27, 2014

(87) PCT Pub. No.: WO2012/167375
PCT Pub. Date: Dec. 13, 2012

(65) Prior Publication Data
US 2014/0183054 A1    Jul. 3, 2014

Related U.S. Application Data

(60) Provisional application No. 61/493,841, filed on Jun. 6, 2011.

(51) Int. Cl.
*C02F 1/461* (2006.01)
*C25B 1/02* (2006.01)
(Continued)

(52) U.S. Cl.
CPC .............. *C02F 1/461* (2013.01); *C02F 1/4672* (2013.01); *C02F 1/46104* (2013.01); *C25B 1/02* (2013.01); *C25B 11/02* (2013.01); *C25B 11/0478* (2013.01); *C25B 15/08* (2013.01); *C02F 2001/46142* (2013.01);
(Continued)

(58) Field of Classification Search
CPC .............. C02F 1/46104; C02F 1/4672; C02F 2201/4611
See application file for complete search history.

(56) References Cited

U.S. PATENT DOCUMENTS 4,399,020 A      8/1983   Branchick et al.
5,272,017 A  *  12/1993   Swathirajan .............. C25B 9/10
                                                                    429/309
(Continued)

FOREIGN PATENT DOCUMENTS

CA      2 632 768 A1      11/2009
CN      101643258 A  *    2/2010  .............. C02F 1/467
(Continued)

OTHER PUBLICATIONS

Andrade et al., "Degradation of phenol using Co- and Co,F-doped $PbO_2$ anodes in electrochemical filter-press cells," *Journal of Hazardous Materials 153*: 252-260, 2008.
Butt et al., "Electrolytic Hydrogen Generation from Pharmaceutical Laden Wastewater," WEFTEC 2008 Conference Proceedings, 8 pages.
(Continued)

*Primary Examiner* — Nicholas A Smith
(74) *Attorney, Agent, or Firm* — Seed IP Law Group PLLC

(57) ABSTRACT

An efficient method and system for the electrochemical treatment of waste water comprising organic and/or inorganic pollutants is disclosed. The system comprises an electrolytic cell comprising a solid polymer, proton exchange membrane electrolyte operating without catholyte or other supporting electrolyte. The cell design and operating conditions chosen provide for significantly greater operating efficiency.

18 Claims, 5 Drawing Sheets

(51) Int. Cl.
*C25B 11/02* (2006.01)
*C25B 11/04* (2006.01)
*C25B 15/08* (2006.01)
*C02F 1/467* (2006.01)

(52) U.S. Cl.
CPC ............... C02F 2201/4614 (2013.01); C02F 2201/4618 (2013.01); C02F 2201/46135 (2013.01); Y02E 60/366 (2013.01)

(56) References Cited

U.S. PATENT DOCUMENTS

| | | | |
|---|---|---|---|
| 5,484,512 | A | 1/1996 | Sasaki et al. |
| 5,770,033 | A | 6/1998 | Murphy et al. |
| 5,972,196 | A | 10/1999 | Murphy et al. |
| 6,328,875 | B1 | 12/2001 | Zappi et al. |
| 6,533,919 | B1 | 3/2003 | Narayanan et al. |
| 8,172,990 | B2 | 5/2012 | McAlister |
| 2004/0081749 | A1* | 4/2004 | O'Brien .............. C25B 9/10 427/58 |
| 2006/0144700 | A1* | 7/2006 | Carson .............. A61L 2/035 204/252 |
| 2007/0134428 | A1* | 6/2007 | Carlson .............. C25B 1/265 427/419.2 |
| 2009/0061276 | A1* | 3/2009 | Tamura .............. H01M 4/8605 429/502 |

FOREIGN PATENT DOCUMENTS

| | | |
|---|---|---|
| CN | 101643258 | 10/2010 |
| WO | WO 99/01382 A1 | 1/1999 |
| WO | WO 03/093535 A2 | 11/2003 |
| WO | WO 2005/095282 A1 | 10/2005 |
| WO | WO 2009/045567 A2 | 4/2009 |

OTHER PUBLICATIONS

Grimm et al., "Characterization of doped tin dioxide anodes prepared by a sol-gel technique and their application in an SPE-reactor," *Journal of Applied Electrochemistry 30*: 293-302, 2000.

Heyl et al., "Electrochemical detoxification of waste water without additives using solid polymer electrolyte (SPE) technology," *Journal of Applied Electrochemistry 36*: 1281-1290, 2006.

Jiang et al., "Simultaneous Hydrogen Production and Electrochemical Oxidation of Organics Using Boron-Doped Diamond Electrodes," *Environ Sci Technol 42*: 3059-3063, 2008.

Kargi, "Comparison of different electrodes in hydrogen gas production from electrohydrolysis of wastewater organics using photovoltaic cells (PVC)," *International Journal of Hydrogen Energy 36*: 3450-3456, 2011.

Kiliç et al., "Hydrogen production by electrochemical decomposition of formic acid via solid polymer electrolyte," *Fuel Processing Technology 90*: 158-163, 2009.

Mao et al., "A Modified Electrochemical Process for the Decomposition of Hydrogen Sulfide in an Aqueous Alkaline Solution," *J Electrochem Soc 138*(5): 1299-1303, May 1991.

Murphy et al., "Direct Electrochemical Oxidation of Organics for Wastewater Treatment," *Wat Res 26*(4): 443-451, 1992.

Navarro-Solís et al., "$H_2$ production by PEM electrolysis, assisted by textile effluent treatment and a solar photovoltaic cell," *International Journal of Hydrogen Energy 35*: 10833-10841, 2010.

Park et al., "Solar-Powered Production of Molecular Hydrogen from Water," *The Journal of Physical Chemistry C Letters 112*(4): 885-889, 2008.

Marshall et al., "Production of hydrogen by the electrochemical reforming of glycerol-water solutions in a PEM electrolysis cell," *Int. J. of Hydrogen Energy 33*:4649-4654, 2008.

Wang et al., "Synthesis of ozone from air via a polymer-electrolyte-membrane cell with a doped tin oxide anode," *Green Chem. 8*:568-572, 2006.

\* cited by examiner

EFFICIENT TREATMENT OF WASTEWATER USING ELECTROCHEMICAL CELL

FIELD OF THE INVENTION

The present invention relates to methods and systems for the electrochemical treatment of waste water. In particular, it relates to methods and systems for the removal of organic pollutants and oxidation of inorganic compounds using solid polymer membrane electrolyte electrochemical cells.

BACKGROUND

There is substantial growth in the demand for new wastewater treatment technologies that is being driven by population growth and increasing volumes of wastewater produced, tighter wastewater quality regulations, increasing cost of clean water and water shortages, awareness for the protection of clean water sources and replacement of aging wastewater systems. Industries are specifically being forced both by tougher discharge standards and cost pressures to eliminate their recalcitrant wastewater pollutants prior to discharge, and to adopt on-site water reuse and recycling systems to avoid rising water supply and effluent discharge costs. The requirement is for cost-effective, sustainable water treatment technology that does not require the addition of chemicals and does not produce secondary pollution, is compliant with stringent water quality standards, and has minimal operational and maintenance requirements.

Industrial wastewater can contain organic compounds, many of which are toxic, persistent and resist conventional biological and chemical wastewater treatment. The best approach to treat recalcitrant wastewater is by non-chemical oxidation techniques that can mineralize the pollutants and reduce the organic load and toxicity of the waste, such as electrochemical oxidation. Electrochemical oxidation is sustainable, safe and has a high treatment efficacy eliminating a wide variety of pollutants such as persistent organic pollutants, dioxins, nitrogen species (e.g. ammonia), pharmaceuticals, pathogens, microorganisms, a majority of priority pollutants and pesticides. There are two main approaches to electro-oxidation of pollutants in wastewater. The first is to oxidize pollutants by indirect electrolysis, generating a redox reagent in situ as a chemical reactant. The mediator can be a metallic redox couple or a chemical reagent (e.g. chlorine, ozone, peroxides). These processes require the addition of a large amount of chemicals and/or feed oxygen, and produce secondary pollution leading to additional costs for the disposal of the treated wastewater and operation & maintenance of the process. The second approach is to use direct electrochemical oxidation, where the organic pollutants are oxidized on the anode surface.

A variety of cell configurations that include flow-through parallel plates, divided chambers, packed bed electrodes, stacked discs, concentric cylinders, moving bed electrodes and filter-press have been developed for direct electrochemical wastewater treatment. However, common to all these electrochemical cell configurations is poor operational efficiency leading to high energy consumption. The wastewater is utilized as electrolyte, and in the case of divided cells, both anolyte and catholyte. Due to very low ionic conductivity of wastewater though, the addition of a supporting electrolyte is required to improve the cell efficiency and obtain reasonable cell voltages. This generally results in salt, base and/or acid concentrations that exceed allowable pollutant discharge limits thereby adding the cost for both the disposal of the treated wastewater and the balance of plant costs of liquid electrolyte handling. Large electrode gaps and low surface area electrodes are also contributors to efficiency losses and increased energy consumption. Slow mass transport in the pores of the porous beds, non-optimized catalyst materials with poor reaction kinetics, high electrode overpotentials, and catalysts with low over potentials for side reactions (e.g. oxygen evolution) also contribute to lower performance and efficiency losses. The use of cell component materials which passivate quickly and increase cell resistivity and instabilities, contribute to efficiency losses. Operating conditions also contribute to efficiency losses. With high mass and ionic transfer losses, at nominal operating current densities, the voltages are too low such that incomplete destruction of organic contaminants occurs and an organic film blocks catalyst sites reducing performance and requiring the use of cell reversal techniques to clean the electrode surfaces.

For instance, published PCT application WO9901382 discloses an electrolytic cell method and apparatus for the decontamination of fluids. The system advantageously comprises means for adding one or more chemical substances into the fluid to be treated (e.g. an acid, carbon dioxide, an alkali, hydrogen peroxide, or a salt.) In another example, Andrade et al. in J. Haz. Mats. 153, 252-260 (2008) disclose the use of a divided electrolytic cell to treat model phenol wastewater. A supporting electrolyte of sulfuric acid was required.

To eliminate the requirement for supporting electrolyte addition, various methods have been developed that reduce the electrode gap in single compartment electrochemical cell configurations. For example, U.S. Pat. No. 6,328,875 discloses the use of a porous anode allowing wastewater to penetrate through the anode to flow through the capillary inter-electrode gaps. However, the energy consumption was still high when run without a supporting electrolyte. As with all single chamber electrochemical systems, hydrogen is simultaneously produced and wastewater constituents are reduced on the cathode, which consume much energy. Fouling of the cathode commonly occurs from these reaction products, decreasing the cell efficiency and leading to increased energy consumption. Another problem encountered in single chamber systems during oxidation is the production of intermediate compounds. These compounds are reduced at the cathode and are then reoxidized at the anode decreasing cell efficiency and increasing energy consumption.

An approach to eliminate the requirement for addition of a supporting electrolyte addition is to use a solid polymer electrolyte (SPE) in the electrolytic cell. SPE technology has been developed for other purposes including the production of hydrogen by water electrolysis and of energy using polymer electrolyte membrane fuel cells. For instance, in the system disclosed in WO03093535, dehalogenation of halogenated organic compounds and destruction of nitrates is conducted on the cathode by electrochemical reduction. In this configuration, the anode and cathode compartments are divided by an ion exchange membrane and an anolyte and halogen-containing catholyte are passed through their respective chambers. Although the system operated without supporting electrolytes, in order to operate at low current density (high cell efficiency), a supporting electrolyte was required in the anolyte and/or catholyte. Murphy et al. in Wat. Res. 26(4) 1992 443-451 used a SPE electrolytic cell to treat wastewaters with low or negligible supporting electrolyte content. The wastewater was re-circulated through both the anode and cathode. The energy consumption was very high however, and was attributed to low rates of phenol oxidation and side reactions, primarily oxygen evolution from water. J. H. Grimm et al. in J. Appl. Elect. 30, 293-302 (2000) used a SPE electrolytic cell to treat model phenol containing wastewater. The wastewater was pumped through the anode and cathode chambers in series. The energy consumption however was also high for phenol removal, which was attributed by the authors to the loss in current efficiency due to side reactions such as oxygen evolution. Further, A. Heyl et al. in J. Appl. Electrochem. (2006) 36:1281-1290 investigated a range of SPE electrolytic cell configurations at higher temperatures to de-chlorinate 2-chlorophenol model wastewater. In all cases, the wastewater was pumped across the membrane from either the cathode or anode to the opposite chamber through perforations in the membrane or by assisted electro-osmotic drag of treated membranes. The energy consumption was found to be impractically high for the untreated membrane, lower for the chemically treated membrane, and lowest for the perforated membrane. However, the best mineralization was obtained with anodic oxidation first followed by cathodic reduction with higher energy consumption. Still further, another approach for treating low conductivity wastewater without the use of supporting electrolytes was disclosed in WO2005095282. The system used a solid polymer electrolyte sandwiched between anode and cathode electrodes place in a single chamber of low conductivity wastewater. The energy consumption for pollutant mineralization of this setup was high due to the high voltages required.

Systems have also been developed in the art to reduce the cost of producing hydrogen by electrolysis by integrating electrolytic treatment of wastewater therewith. The electrolytic cells involved can use anolytes containing organic pollutants. For instance, Park et al. in J. Phys. Chem. C. 112(4) 885-889 (2008) used a single chamber cell to treat aqueous pollutants and produce hydrogen. As with all single chamber systems, a supporting electrolyte was required. The hydrogen generated was contained in a mixed product gas that required further treatment to recover usable hydrogen. Similar single chamber configurations were disclosed by T. Butt & H. Park in WEFTEC 2008 Conference Proceedings and by J. Jiang et al. in Environ. Sc. & Tech. 42(8), 3059 (2008). Divided cell configurations were disclosed for instance in WO2009045567 and by Navarro-Solis et al. in I J Hydrogen Energy 35 (2010) 10833-10841. The preceding systems all involved the use of additional supporting electrolytes. Systems without supporting electrolytes have also been disclosed for instance by F. Kargi in I. J. Hydrogen Energy 36 (2011) 3450-3456.

Systems using a solid polymer electrolyte based electrolytic cell have also been disclosed in the art to generate hydrogen and to treat wastewater. For instance, U.S. 65/333, 919 discloses a method for electrolysis of an aqueous solution of an organic fuel. In this system, permeation of unreacted methanol to the cathode (fuel crossover) takes place and causing high cathode overpotentials and requiring the addition of a hydrogen gas cleaning operation. Further, E. O. Kilic et al. in Fuel Proc. Tech. 90 (2009) 158-163 disclose a system to treat formic and oxalic acid and generate hydrogen. However, the specific energy consumption was high due to the higher current densities required.

Notwithstanding the substantial developments in the art, there remains a continuing need for more efficient and cost effective methods for wastewater treatment. The present invention addresses this need while additionally providing other benefits as disclosed herein.

SUMMARY OF THE INVENTION

Methods have been discovered for the energy efficient treatment of polluted wastewater using certain electrolytic cell designs and a combination of voltage and current density limitations. A lower current density results in better efficiency, and a lower voltage results in less unwanted side reaction (e.g. oxygen evolution). Improved energy efficiency can be achieved while essentially removing all the pollutant.

The electrolytic cell employed comprises a solid polymer electrolyte electrolytic cell comprising an anode, a cathode, and a solid polymer membrane electrolyte separating the anode and the cathode. The anode comprises an anode catalyst layer, and the anode catalyst layer comprises an anode catalyst. In a like manner, the cathode comprises a cathode catalyst layer and the cathode catalyst layer comprises a cathode catalyst. The cathode in the electrolytic cell is liquid-electrolyte free. That is, the cathode comprises no liquid catholyte nor liquid supporting electrolyte.

Specifically, the method comprises supplying a flow of wastewater comprising a pollutant to the anode of the electrochemical cell, providing a voltage less than about 3 volts across the electrolytic cell wherein the anode is positive with respect to the cathode, and operating the electrolytic cell at an operating temperature and a current density less than about 20 $mA/cm^2$, and particularly less than about 10 $mA/cm^2$. This results in the pollutant being degraded and hydrogen gas being generated at the cathode. The generated hydrogen gas is exhausted from the cathode.

The flow of wastewater can be supplied to the anode without an added supporting electrolyte, and the electrolytic cell can be operated over a wide range of wastewater temperatures, e.g. any liquid phase wastewater temperature. In particular, the operating temperature can be in the range from about 3 to 95° C. Further, the flow of wastewater supplied to the anode may be provided at elevated pressures (e.g. up to 30 psi).

Certain electrolytic cell constructions can be advantageous for this purpose. For example, the spacing between the anode and the cathode can be less than about 30 micrometers. Alternatively however, the spacing may be up to 100 micrometers if increased electrolyte thickness is desired for durability and/or high temperature service.

The anode catalyst can be selected from the group comprising platinum, tin oxide, antimony tin oxide, niobium doped antimony tin oxide, graphite, and manganese oxide. The anode catalyst can also be niobium doped antimony tin oxide further comprising a dopant selected from the group Fe, F, Pt and Ni, or tin oxide doped with Mo, Cr, Bi, W. cobalt, nickel, palladium, niobium, tantalum, platinum, palladium, vanadium, rhenium and mixtures of such dopants, or antimony tin oxide dispersed on Nb, Pd, carbides, nitrides, borides, corrosion resistant metals, alloys, and metal oxides (such as Nb, $Nb_2O_5$, ZnO, NbC).

The cathode catalyst can be selected from the group comprising platinum, manganese oxide, graphite, and carbon. The cathode catalyst can also be palladium, Rh, nickel & oxides thereof, supported Pd/C carbon/graphite, or manganese oxide.

Further, the anode can comprise a fluid distribution layer and a microporous sublayer between the anode catalyst layer and the fluid distribution layer. The fluid distribution layer can comprise one or more of sintered mesh screen, sintered fiber media, expanded metal foil of Ti and its alloys, stainless steel, niobium, nickel, Inconel, or copper. The microporous sublayer can comprise particles of carbides, nitrides, borides, or noble and valve metals and metal alloys, or metal oxides. Further, the microporous sublayer can comprise sintered particles of Ti and its alloys, stainless steel, niobium, nickel, Inconel, or copper.

In a like manner, the cathode can comprise a gas diffusion layer and a microporous sublayer between the cathode catalyst layer and the gas diffusion layer.

The anode catalyst layer may desirably comprise high surface area carbon and/or graphite particles (e.g. having a surface area greater than 280 $m^2/g$). Further, it can additionally comprise Nb, Pd, carbides, nitrides, borides, corrosion resistant metals, alloys, and metal oxides (e.g. Nb, $Nb_2O_5$, ZnO, NbC and/or mixtures thereof), or perovskite-based metal oxides. In particular, the anode catalyst layer can comprise Ta, Nb, or TiC particles having a particle size less than 45 microns. Further still, both the anode and catalyst layers can comprise ionomer, PTFE, PFA, or PVDF, or Perovskite-based metal oxides.

The method is suitable for removing a variety of pollutants from wastewater, e.g. an organic or mixture of organics, inorganics such as ammonia or hydrogen sulfide, or mixtures of organics and inorganics. As demonstrated in the Examples, the method is suitable for removing an organic pollutant such as Acid Blue dye, phenol, acetaminophen, formic acid, ibuprofen, or a mixture of organic pollutants from Kraft pulp and paper mill effluent. Pollutants oxidized using the method include dissolved organics, biological oxygen demand (BOD), chemical oxygen demand (COD), total organic carbon (TOC), recalcitrant organics that remain after biological treatment processes, ammonia, dissolved gases (VOC light hydrocarbons and $H_2S$ hydrogen sulfide), microorganisms, pathogens, and metal ions.

Advantageously, the exhausted generated hydrogen gas produced at the cathode can be recovered and usefully converted back into electricity, thereby further improving overall energy efficiency.

The method can additionally comprise a post treatment step for removing free chlorine selected from the group consisting of: reducing electrochemically, adsorbing, decomposing by contacting a transition metal, reacting with a salt, reacting with a chemical reducing agent, reacting with organic matter, decomposing by contacting a redox filter, decomposing by light exposure, and decomposing by heating.

Further, the method can comprise a step for preventing formation of chlorine selected from the group consisting of: controlling the pH of the wastewater to be greater than about 2, increasing the ionomer concentration at the anode fluid delivery layer, increasing the ionomer concentration at the anode catalyst layer, and incorporating materials that are known to catalyze the decomposition of free chlorine into the anode. The latter materials can include transition elements such as iron, copper, manganese, cobalt and nickel, Raney metals of copper, nickel and cobalt, their oxides and spinels and can be mixed into the anode catalyst layer. Alternatively, such materials can be applied as coatings to the anode fluid delivery layers and/or anode plates to effect decomposition of free chlorine.

And the method can additionally comprise a cleaning step selected from the group consisting of: ion exchanging in-situ, purging the cathode with a cleaning solution, and potentiostatic cleaning.

The associated system for the treatment of wastewater thus comprises a solid polymer electrolyte electrolytic cell in which both the system and the electrolytic cell are configured to operate according to the method. For instance, the system is configured to provide a flow of wastewater to the anode and operate at appropriate voltage and current densities but it does not require means for adding a supporting electrolyte to the flow of wastewater. The system can comprise greater than one electrolytic cell in a stack, series or parallel arrangement. Further, the system can comprise monopolar or bipolar configurations, including bipolar pairs within a monopolar stack.

DETAILED DESCRIPTION

Certain terminology is used in the present description and is intended to be interpreted according to the definitions provided below. In addition, terms such as "a" and "comprises" are to be taken as open-ended. Further, all US patent publications and other references cited herein are intended to be incorporated by reference in their entirety.

Herein, SPE stands for solid polymer electrolyte and can be any suitable ion conducting ionomer, such as Nafion®. A SPE electrolytic cell is thus a cell comprising a SPE as the electrolyte to which electrical energy is supplied to effect a desired electrochemical reaction (with a positive voltage being applied to the anode of the cell).

Herein, unless otherwise specified, when referring to a numerical value the term "about" is intended to be construed as including a range of values within plus or minus 10% of the value being referred to.

An electrode in the cell is "liquid-electrolyte free" means that no significant ion containing liquid is deliberately provided to the electrode, such as is done in certain systems in the prior art. However, it is not intended at the cathode for instance to exclude minor amounts of wastewater which may cross over through a solid polymer electrolyte.

The energy efficient system of the invention employs a simple, compact electrolytic cell architecture to minimize ionic, ohmic and mass transport resistances, and is characterized by a reduced operating voltage and current density, low-cost components, a chemically stable, non-liquid electrolyte membrane, and low-cost, durable and high performance electrode and catalyst designs. Recovery of high purity, by-product hydrogen is possible for enhanced efficiency.

Figure 1:
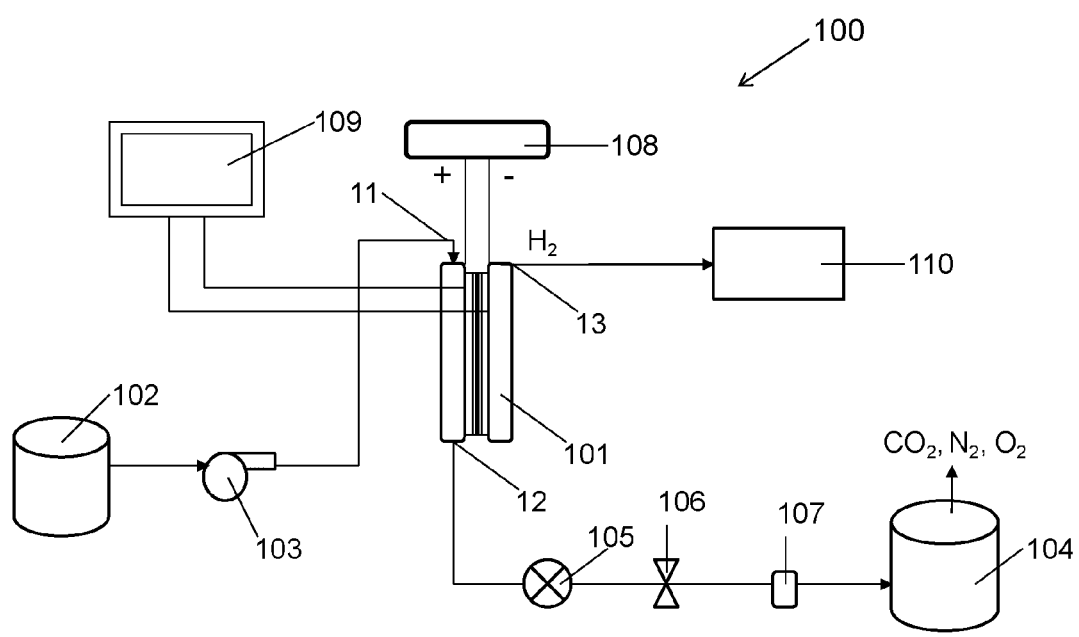
FIG. 1 shows a schematic of one embodiment of the inventive system and was used to perform the laboratory scale wastewater treatment in the Examples.

An exemplary system is shown in the schematic of FIG. 1. System 100 comprises SPE electrolytic cell 101 for the direct electrochemical treatment of organic contaminated wastewater. A controlled flow of wastewater 102 is supplied to anode inlet 11 of cell 101 by some suitable delivery means, e.g. peristaltic pump 103. After sufficient treatment/transit time in cell 101, the treated wastewater exits at anode outlet 12 and as shown here is delivered to treated effluent tank 104 where entrained or by-product gases generated during treatment (e.g. carbon dioxide, nitrogen, oxygen) are allowed to vent to atmosphere. For monitoring and flow control purposes, pressure gauge 105, valve 106, and flowmeter 107 are provided in the anode outlet line.

Electrical energy is provided to cell 101 by DC power supply 108 and the temperature of cell 101 is monitored and controlled by temperature controller 109. Hydrogen is generated at the cathode of cell 101 as a result of the electrochemical treatment and is exhausted at cathode outlet 13. As shown in FIG. 1, the relatively pure hydrogen may be collected and stored in storage container 110 for later use in the generation of electricity or as a fuel or chemical reactant.

Figure 2:
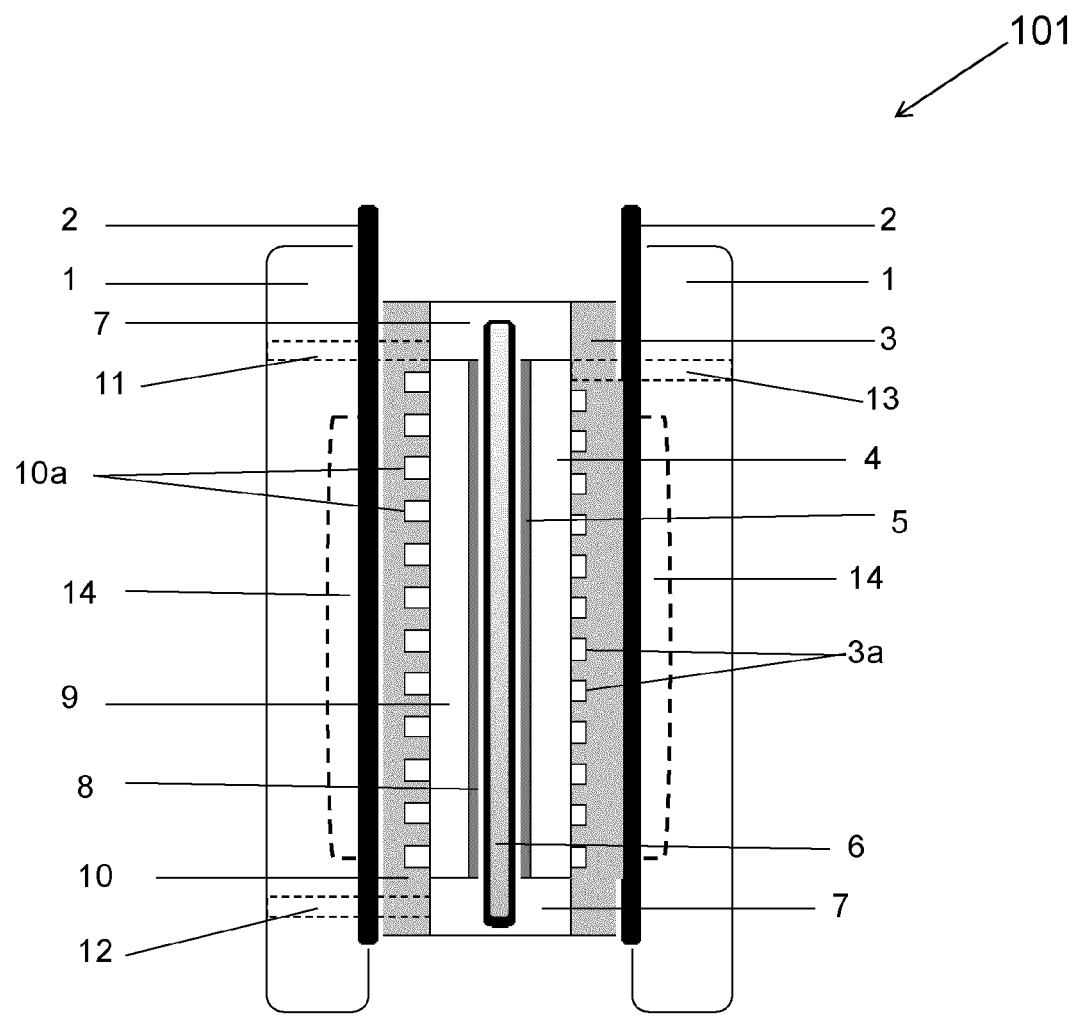
FIG. 2 shows a schematic of the solid polymer electrolyte cell used in the system of FIG. 1.

FIG. 2 shows a detailed schematic of solid polymer electrolyte cell 101. Cell 101 comprises SPE membrane electrolyte 6. The cell anode comprises anode catalyst layer 8 and anode fluid delivery layer 9. The cell cathode comprises cathode catalyst layer 5 and cathode gas diffusion layer 4. Anode flow field plate 10 is provided adjacent anode fluid delivery layer 9. Anode flow field plate 10 comprises flow field channel/s 10a which are fluidly connected to anode inlet 11 and anode outlet 12. Wastewater 101 is delivered uniformly to and from anode fluid delivery layer 9 by directing it through flow field channel/s 10a. Cathode flow field plate 3 is provided adjacent cathode gas diffusion layer 4. Cathode flow field plate 3 comprises flow field channel/s 3a which are fluidly connected to cathode outlet 13. Since no catholyte nor other liquid nor fluid is supplied to the cathode, a cathode inlet is not required. Hydrogen gas generated during the electrochemical treatment of wastewater 101 however is collected from the cathode and directed out of the cell by way of flow field channel/s 3a. Leads 2 are provided at the cell electrodes in order to make electrical connections to power supply 108. Mechanical support is provided to the components in cell 101 by way of end plates 1 which clamp the cell together. Sealing is provided to the cell by seals 7. Finally, FIG. 2 shows heating elements 14 which may be used to control the cell temperature during operation.

Unexpectedly high energy efficiency can be obtained from system 100 and can result from appropriate limitations to the voltage and current density applied to the cell and by adoption of some of the designs and components used in advanced SPE fuel cells for the generation of electricity. In particular, the voltage applied across electrolytic cell 101 (or across individual cells if more than one is employed in a system) should be less than about 3 volts. The current density is limited to below about 20 mA per cm² of electrode area. And as discussed further below, certain catalyst choices, catalyst layer constructions, fluid delivery layer and gas diffusion layer constructions can benefit operating efficiency.

The reasons for the improved efficiency of the instant invention are not completely understood. However, without being bound by theory, several mechanisms may be involved at the anode for the mineralization of organic pollutants. Oxygen for the "electrochemical incineration" of organic pollutants in the wastewater is obtained from water from an oxygen evolution reaction. Adsorbed hydroxyl radical and oxygen radical species generated on the surface of the anodic catalyst can mineralize organic pollutants present. In addition, for certain n-type semiconductor oxide catalyst, anionic (oxygen) vacancies can preferentially react with water and generate OH*radicals. Oxidation via intermediates of oxygen evolution/hydroxyl radicals at anodic potentials in the region of water discharge can mineralize or partially oxidize organic pollutants. Direct oxidation of ammonia to nitrogen may occur. Further, indirect electrochemical oxidation may take place by inorganic oxidants generated by anodic oxidation of sulfate, carbonate, or phosphate ions in the wastewater. And further still, there may be indirect electrochemical oxidation by redox reagents electrochemically generated from a mediator present in the wastewater.

The chemical reactions involved at the anode can include:

For the mineralization of organic compounds, R, through oxygen transfer from water and evolved oxygen:

$$R + \frac{n}{2}H_2O \rightarrow \text{mineralization products}[CO_2 + \text{salts, etc.}] + nH^+ + ne^-$$

$$2H_2O \rightarrow O_2 + 4H^+ + 4e^-$$

$$R + \frac{n}{4}O_2 \rightarrow \text{mineralization products}[CO_2 + \text{salts, etc.}] + nH^+ + ne^-$$

For hydroxyl and oxygen radicals, and intermediates of $O_2$ evolution on a catalyst surface:

$$H_2O \rightarrow OH^*_{ads} + H^+ + e^-$$

$$(h^+)_{vac} + H_2O \rightarrow (OH^*)_{ads} + H^+ + e^-$$

$$R + [OH^*\text{radicals}/O^*\text{species/intermediates}]_{ads} \rightarrow \text{mineralization products}[CO_2 + \text{salts, etc.}] + nH^+ + ne^-$$

For the oxidation of ammonia $$4NH_3 + 3O_2 \rightarrow 2N_2 + 6H_2O$$

$$NH_3/NH_4 + OH^* \rightarrow N_2 + H_2O + H^+ + e^-$$

and if the wastewater is alkaline, removal via free chlorine $$HOCl + \tfrac{2}{3}NH_3 \rightarrow \tfrac{1}{3}N_2 + H_2O + H^+ + Cl^-$$

$$NH_3/NH_4 + HOCl/OCl^- \rightarrow N_2 + H_2O + H^+Cl^-$$

For the formation of inorganic oxidants, e.g.:

$$2CO_3^{2-} \rightarrow C_2O_6^{2-} + 2e^-$$

$$2PO_4^{3-} \rightarrow P_2O_8^{4-} + 2e^-$$

For the generation of oxidants in-situ, e.g. NaCl in wastewater:

$$2Cl^- \rightarrow Cl_2 + 2e^-$$

$$\tfrac{1}{2}Cl_2 + H_2O \rightarrow HOCl + H^+ + Cl^-$$

$$HOCl \rightarrow H^+ + OCl^-$$

For $H_2S$:

$$H_2S \rightarrow S^\circ + 2H^+ + 2e^-$$

And if the wastewater is alkaline, via electrochemical decomposition (see "A Modified Electrochemical Process for the Decomposition of Hydrogen Sulfide in an Aqueous Alkaline Solution", Z. Mao, A. Anani, Ralph E. White, S. Srinivasan & A. J. Appleby. Journal of the Electrochemical Society, 1991, pages 1299-1303.) A pH control apparatus may be employed to facilitate alkaline decomposition And for metal ions [e.g. transition metal ions such as iron, manganese]:
oxidization via hydroxyl radicals and oxygen
oxidation via hydroxyl radicals, e.g. $Mn+OH^* \rightarrow Mn^{-1}+OH^-$
or oxidation with oxygen, e.g.

$$2Fe^{2+}+\tfrac{1}{2}O_2+5H_2O \rightarrow 2Fe(OH)_3\downarrow +4H^+$$

$$Mn^{2+}+\tfrac{1}{2}O_2+H_2O \rightarrow MnO_2\downarrow +2H^+$$

For such purposes, oxygen generating electrocatalysts may desirably be incorporated into a catalyst layer deposited on a fluid diffusion layer. Further, the residence time of wastewater in contact with the catalyst layer may be increased to complete oxidation, and a microfilter may be employed in the system to remove resulting metal precipitates.

Meanwhile at the cathode, hydrogen evolution occurs as:

$$nH^+ + ne^- \rightarrow \frac{n}{2}H_2(g)$$

Kinetic effects generally are believed to dominate at the low current densities involved in the present method, and thus the catalysts used may have a great effect. A high active surface area may allow more OH radicals to be available, the electron and proton transfer media present (e.g. conductive particles and ionomer) enhance charge transfer, and additional particles may also contribute to generate local oxygen (e.g. high surface area graphite particles). The use of advanced fuel cell components may also assist in improved mass transfer and current collection and local mixing of fluids at the catalyst surfaces if there is not excessive oxygen generation at the anode.

In the present invention, there may be a preferred amount of oxygen produced where too little means not enough is present for the pollutant removal related reactions to take place at a reasonable rate and yet where too much oxygen production is parasitic and the current density shoots up while the rate of contaminant removal remains the same. In the list of preceding anode reactions, the mineralization of organic compound reactions is frequently cited in the literature. However, the reactions for hydroxyl and oxygen radicals, and intermediates of $O_2$ evolution on a catalyst surface may be of importance. A small amount of locally generated oxygen may occur on alternative particles without compromising catalytic sites for OH radicals. In effect, this may result in increased reaction kinetics, and the same organic pollutant removal rate might be achieved at lower applied voltage and current densities. For electrodes in the prior art, in order to obtain a decent level of OH radicals, the applied voltage needs to be increased thereby driving the cells into a substantial range for oxygen production that may then compete with radical production sites. That is, higher voltages and current densities may be needed in the prior art to get an equal amount of OH radicals.

Regardless, unexpected improved energy efficiency has been obtained when appropriately limiting the applied voltage and current density as mentioned previously and also by using certain electrolytic cell designs and components. SPE membrane electrolyte 6 is a suitable proton conducting solid polymer electrolyte and is preferably a thin, extended life material choice to increase efficiency (e.g. sulfonated tetrafluoroethylene based fluoropolymer-copolymer such as Nafion® in a thickness less than about 30 micrometers). However, for durability and/or high temperature service, membrane electrolyte thickness may desirably be increased to between 50 and 100 micrometers (e.g. by laminating thinner membranes together or using thicker membranes).

With regards to the anode catalyst, platinum, tin oxide, antimony tin oxide, manganese oxide and mixtures thereof have been used successfully in the Examples. In the case of antimony tin oxide, heat treatment to improve its electrical conductivity or doping, for instance with Nb, may be considered to improve durability. Manganese oxide can be considered for purposes of decomposing any hydrogen peroxide which may be formed at the anode. Other n- and p-type semiconductor oxides, perovskite-like oxide classes, and amorphous or nanocrystalline transition metal oxides (e.g. $MoO_2$) may also be considered as anode catalysts. Further, spinels of cobalt and nickel, and high surface area nickel oxides may also be considered. As is known in the art, use of supported catalysts (e.g. Pt dispersed on carbon or antimony tin oxide on high surface area graphite or Nb particles) can improve the dispersion of the catalytic materials and thus utilization and also the interaction between certain catalysts and supports can enhance catalytic activity and durability. Generally dopants can be employed to improve electrical conductivity (e.g. antimony doped $SnO_2$, chlorine and fluorine doped $SnO_2$) or to improve durability and stability at elevated voltages (e.g. cobalt, nickel, palladium, niobium, tantalum, platinum, palladium, iridium, ruthenium, vanadium, rhenium), and mixtures of such dopants to improve both electrical conductivity and stability/durability (e.g. $SnO_2$ doped with Nb and a dopant selected from the group Sb, Fe, F, Pt and Ni). Other possible dopants include Mo, Cr, Bi, and W.

The selected catalyst materials are catalytic at lower voltages for the organic contaminants (i.e. have a lower overpotential) so the applied voltage required is lower and consequently, the current density is lower. Such catalyst materials have a high overpotential for water electrolysis, so that the generation of oxygen can be controlled at the operating voltage thereby reducing the current density associated with this reaction.

Other considerations in the selection of anode catalyst include use of nanoparticles, nanostructured and/or mesoporous materials to obtain high surface areas. Supported catalysts may be employed using supports of graphite. If stability of graphite at elevated anodic voltages is an issue, stable, conductive particles including carbides, nitrides, borides, corrosion resistant metals, alloys, and metal oxides (e.g. Nb, $Nb_2O_5$, ZnO, NbC and/or mixtures thereof) can be employed. Additives can include perovskite-based metal oxides that exhibit mixed electronic and ionic conductivity.

Anode catalyst layer 8 generally comprises particles to improve electron conduction, ionomer (e.g. similar to that used in the membrane electrolyte) for ion conduction and to serve as a binder, and material to control the wetting characteristics (e.g. dispersed PTFE). Pore size and overall porosity can be engineered to some extent by choice of particle size and agglomerate size (which can be modified for instance by controlling the high shear mixing rate during preparation of a catalyst ink or slurry used to make the catalyst layer). The pore characteristics of the anode catalyst layer, the surface chemistry and surface area can be important with regards to the mass transport of wastewater to the catalyst and the removal of product gas such as carbon dioxide. Preferably, the pore structure and hydrophobic surfaces of the anode catalyst layer facilitate bubble detachment so that gas blanketing and/or pore blockage does not occur. A graded particle size and pore size distribution can be employed in catalyst layer 8 to allow deeper penetration of wastewater and greater catalyst surface area utilization.

Anode fluid delivery layer 9 is provided to readily deliver fluids to and from anode catalyst later 8 in a uniform manner. In addition, it provides electrical contact and mechanical support thereto. Carbon fibre paper, foams, and other materials commonly employed in SPE fuel cell embodiments may be contemplated here as substrates. And materials for electrical conduction and wettability may be added thereto. As with anode catalyst layer 8, the pore size distribution and bulk porosity of anode fluid delivery layer 9 is carefully controlled as it can be important with regards to carbon dioxide bubbles formed (effecting size and mixing) and their effect on mass transport. Sublayers (not shown in FIG. 2) commonly used in fuel cell embodiments may be incorporated in anode fluid delivery layer 9 and located adjacent to anode catalyst layer 8 in order to improve contact to the latter and to provide an asymmetric pore size distribution across layer 9 (e.g. to provide larger pores on the side adjacent anode flow field plate 10 which may act as a pre-filter preventing suspended solids from blocking catalyst sites).

If elevated anode potentials are involved, dissolution of materials such as carbon fiber paper may occur. In such cases, more stable media can be employed including metal coated (e.g. nickel coated) carbon fiber paper or woven cloth, metal screen/gauze/cloth (particularly with 2 or more ply screens with different mesh sizes and the smaller closest to membrane, with weave patterns to promote in-plane water permeability, flattened and diffusion bonded or spot welded together), sintered metal screen/gauze/cloth (again with 2 or more ply screens to improve current distribution and flattened), expanded metal foil/film/membrane (with 1 or more plies and flattened), sintered metal fiber and powder media (again with 1 or more plies and flattened, having asymmetric pore size and with the smaller pore diameter located closest to membrane, and having high in-plane water permeability), flattened photo-etched media, chemically etched media, micro-perforated plate, or combinations thereof. The preceding materials are electrically conductive and can be corrosion resistant types [stainless steel, inconel, monel, titanium, alloys, valve metals] or have corrosion resistant coatings applied thereto [e.g. carbides, nitrides, borides, noble & valve metals & metal alloys, metal oxides]. Conductive coatings may be applied to the surfaces contacting the catalyst coated membrane if the corrosion resistant materials employed form passive layer. Sublayers can be applied incorporating corrosion resistant and electrically conductive particles [e.g. carbides, nitrides, borides, noble & valve metals & metal alloys, metal oxides]. For monopolar designs, high in-plane conductivity is desirable, suggesting use of corrosion resistant, conductive, materials and coatings therefor.

The cathode catalyst can be selected from the group of conventional catalysts commonly used for hydrogen evolution, including platinum or supported platinum (e.g. carbon supported platinum), palladium, palladium alloys, supported Pd/C, nickel & oxides thereof, rhodium (e.g. metals where significant coverage by $H_2$ species is possible), molybdenum disulfide, perovskite-based metal oxides that exhibit mixed electronic and ionic conductivity, amorphous or nanocrystalline transition metal oxides, and high surface area Raney metals and metal blacks. In addition, manganese oxide, graphite, and carbon may also be employed at the cathode. Again, manganese oxide may be beneficial to decompose any hydrogen peroxide present. Along with cathode catalyst, cathode catalyst layer 5 also generally can comprise particles to improve electron conduction, ionomer for ion conduction and to serve as a binder, and material to control the wetting characteristics. Cathode catalyst layer 5 can be prepared by coating onto cathode gas diffusion layer and sintering at an appropriate temperature (e.g. about 150° C. or 370° C. respectively depending on whether ionomer or PTFE is employed). Conductive particles in layer 5 can desirably be mixed to provide a size distribution that optimizes current distribution and porosity for hydrogen recovery. If erosion is an issue, PTFE and/or other stable binders in catalyst layer 5 can be employed for improved erosion/wear resistance.

Cathode gas diffusion layer 4 is provided to readily deliver gases to and from cathode catalyst later 5 in a uniform manner. Layer 4 is desirably designed to repel wastewater which may cross-over from the anode side through the membrane electrolyte, while still permitting ready removal of generated hydrogen gas. Thus, a hydrophobic construction may be employed, for instance a teflonated stainless steel mesh substrate. Further, use of a hydrophobic sublayer with a small pore structure adjacent cathode catalyst layer 5 may also serve to prevent wastewater cross-over from entering the rest of the cathode. In turn, this can reduce or eliminate parasitic reactions and contamination at the cathode and thereby help keep the current density low. In general, materials similar to those employed in anode fluid delivery layer 9 may be considered. For monopolar designs, high in-plane conductivity is desirable, suggesting use of corrosion resistant and hydrogen resistant, conductive, materials and coatings therefor (e.g. nickel, palladium alloys, titanium nitride, etc.).

The flow field channels 3a, 10a in the cathode and anode flow field plates 3, 10 can have numerous configurations, including single serpentine, interdigitated, and/or multiple linear designs, and the cross-sections can have various shapes. Designs for gravity assist may be employed. Accommodating the hydrogen generated at the cathode is relatively straightforward and one end of the cathode flow field may be dead-ended. At the anode, channel design preferably maximizes residence and encourages uniform mixing of the liquids and generated gases. It can be useful to provide for turbulence to promote the mixing of gas and liquid and to prevent bubble coalescence and large plugs of gas from forming. This may be accomplished by providing static means for in-line mixing in the channels, e.g. spiral tape, twisted tape, or helical static mixing elements in various locations within flow field channels 10a. Such mixing can serve various purposes including reducing a concentration overvoltage at anode, eliminating radial gradients in temperature, velocity and material composition, and improving mass transport of the wastewater allowing larger channels and higher wastewater flows to be used without any loss to performance. Appropriate mixing components would continuously mix the wastewater and direct the wastewater flow to the outer perimeter so that pollutants are efficiently delivered to the catalyst layer and gas bubbles are contacted with the porous plate surfaces for removal.

FIGS. 1 and 2 depict one possible embodiment of the system and electrolytic cell and versions of this were used in the Examples to follow. However, many other variations are possible and include a monopolar cell design comprising non-conducting plastic plates with conductive film on landings for current collection or with a metal substrate used in the anode fluid delivery layer for current collector. Other monopolar and bipolar variations may be contemplated including bipolar pairs within a monopolar stack. Plate materials in such cases can be varied. In monopolar designs, plates can be electrically insulating and made of plastic, composite (e.g. glass fiber reinforced plastic), ceramic, or metals coated with insulating, corrosion resistant coatings. In bipolar designs, plates are electrically conductive and can be made of composites (carbon plastic, fiber reinforced where fibers are conductive metals, carbides, nitrides, etc.), metals, alloys, and substrates comprising appropriate coatings (similar to those of anode delivery layer 9 on the anode side and gas diffusion layer 4 on the cathode side). In a monopolar stack comprising bipolar pairs, an electrically conductive cathode plate can be employed in between two electrically insulating anode plates.

Dissolved gases (e.g. $CO_2$, $O_2$) may need to be removed due to corrosion and/or undesirable reactions in downstream equipment and processes. For example, in water with low concentrations of minerals, carbon dioxide forms carbonic acid which is corrosive. Degasification methods include heating (e.g. deaerating heaters), reducing pressure (e.g. vacuum deaerators), membrane processes (e.g. membrane contactors), air stripping, substitution with inert gas (e.g. bubbling with argon), vigorous agitation, contact with catalytic resins, and freeze-thaw cycling. For dissolved oxygen, chemical oxygen scavengers may also be added (e.g. ammonium sulfite). For dissolved carbon dioxide additional methods of removal include contact with limestone and/or magnesium oxide (to form carbonates and bicarbonates), chemical reaction with a solution of sodium carbonate to form sodium bicarbonate, and carbonic acid neutralization by controlling the pH between 7.5 and 8.5.

Figure 3:
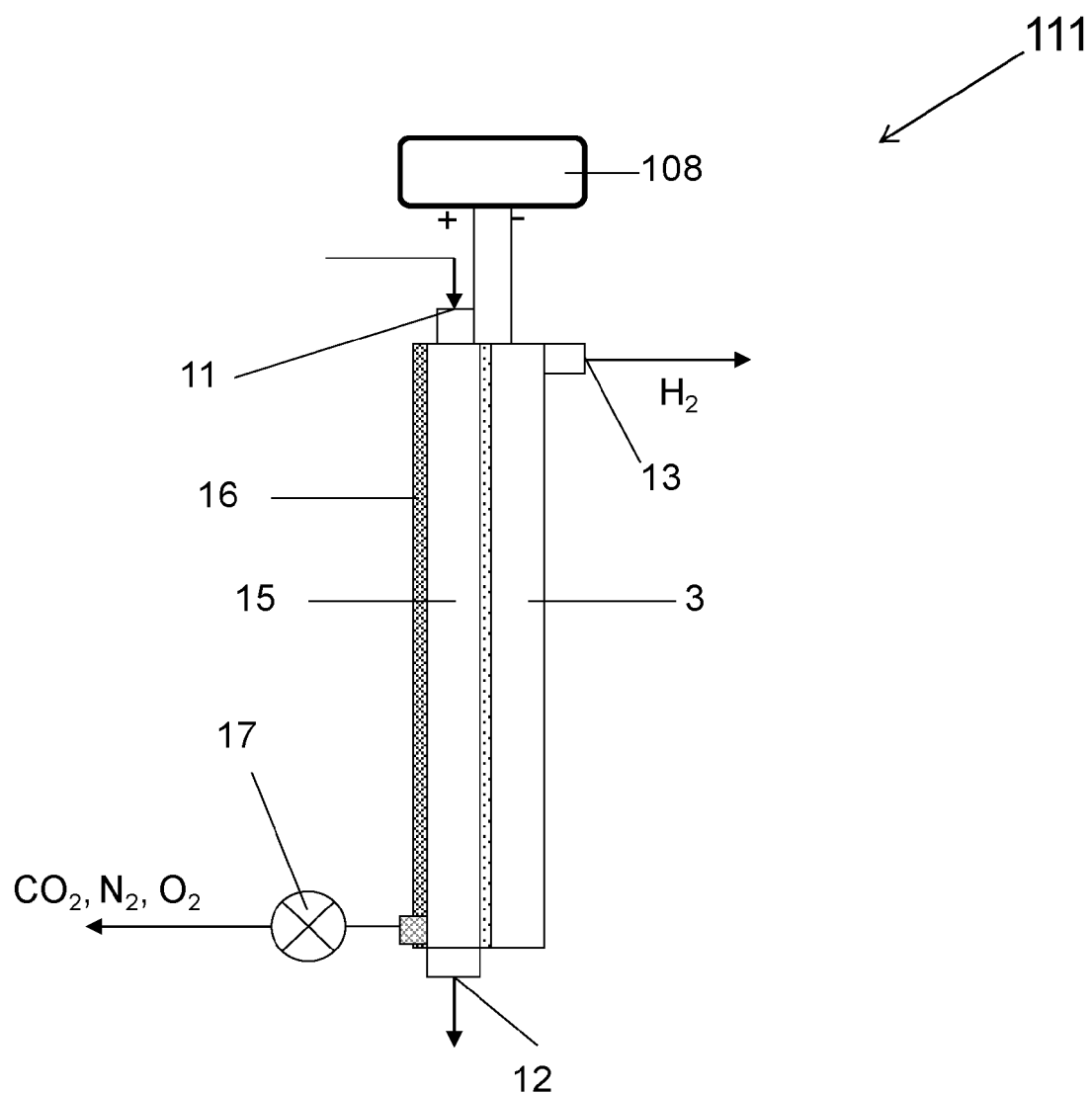
FIG. 3 shows a schematic of an alternative embodiment of an electrochemical cell suitable for use in the inventive system.

Also possible are designs employing a porous anode plate, e.g. porous graphite or porous metal plates with small pores for degassing the wastewater. In such a design, the channel surfaces can be made hydrophobic to prevent water ingress with the maximum pore size dependent on contact angle of plate surface and operating pressure of the wastewater flow. FIG. 3 shows a schematic of such an alternative embodiment 111 based on a porous anode plate option. (In FIG. 3, like numerals have been used to indicate components similar to those shown in FIGS. 1 and 2.) Here, the electrolytic cell comprises porous anode plate 15 and gas collection manifold 16. A vacuum assist at the anode outlet is also provided by vacuum pump 17 to assist in the removal of gases. Other options include the use of a 2-stage system, instead of a single stage, in which to electrolytic cells are employed in series with the anode outlet from one being connected to the anode inlet of the other, and in which generated hydrogen is collected from both cathodes.

Embodiments of the system can comprise multiple electrolytic cells in stacks and in either series and/or parallel arrangements. For example, wastewater can be split and supplied to multiple electrolytic cells or stacks of cells and the flows combined thereafter at the cell or stack outlets. Two stage systems may be employed in which two or more electrolytic cells are configured in series. Here, the anode outlet from an upstream cell may be connected to the anode inlet of a downstream cell with hydrogen generated being collected from both cathodes. In the construction of multiple cell systems, conductive layers may be employed between the fluid diffusion layers and plates or between the gas diffusion layers and plates. Alternatively, conductive foils or membranes may be welded to the fluid diffusion layers or gas diffusion layers.

The energy efficient benefits of the invention are obtained by limiting the current density and the voltage applied per electrolytic cell in the system. Other operating conditions are fairly flexible. Any operating temperature between the freezing point and boiling point of the wastewater may be considered (e.g. from about 3 to 95° C.) although temperatures modestly elevated above ambient may be useful in increasing reaction rates (e.g. from about 25 to 50° C.). Wastewater may typically be supplied at pressures from about 0 to 30 psi. The transit time or residence time of the wastewater is selected in order to ensure adequate removal of pollutants from the wastewater.

Depending on what is specifically in the wastewater, certain modifications can be considered. For instance, if the wastewater contains acid, base, alkali and/or other ionic species that make it conductive, ionomer may not be required in the catalyst layer and an alternative binder may be employed (e.g. PTFE). If high chloride ion levels are present in the wastewater, it may react at anode electrocatalytic sites to produce free chlorine (defined as dissolved $Cl_2$ gas, hypochlorous acid HOCl and/or hypochlorite ion $OCl^-$ in equilibrium together and whose concentrations are a function of pH). Here, pH may be controlled to prevent dissolved $Cl_2$ gas (pH>2). And divalent ions can be added to the wastewater to increase the concentration therein (such as sulphate $SO_4^{2-}$ and/or sulphate salts such as $NaSO_4$). Such divalent ions preferentially adsorb onto the electrode, catalyze oxygen formation, and inhibit the oxidation of chloride ions. Further, transition elements such as iron, copper, manganese, cobalt and nickel, Raney metals of copper, nickel and cobalt, their oxides and spinels can be mixed into the catalyst layer that are known to catalyze the decomposition of free chlorine. Such materials can be applied as coatings to the anode fluid delivery layers and/or anode plates to effect decomposition of free chlorine. Further, a post treatment step may be employed to remove free chlorine, including: electrochemical reduction, adsorption by granular activated carbon or kaolinite clay, decomposition by contacting transition metals (especially copper, iron, nickel and cobalt and/or their oxides and spinels such as substituted cobalt oxide spinels), reacting with salts such as ammonium acetate, ammonium carbonate, ammonium nitrate, ammonium oxalate, and ammonium phosphate, reacting with chemical reducing agents such as sodium metabisulfite, reacting with organic matter such as glycerol, decomposition by contacting redox filters such as copper/zinc alloys, decomposition by light exposure (especially UV), and decomposition by heating the solution. Further still, the ionomer concentration at the anode fluid delivery layer or catalyst layer may be increased to block chloride ions from catalytic reaction sites.

In certain cases during operation, species can undesirably migrate into regions of the electrolytic cell. For instance, if the wastewater contains high levels of metallic ions that are not all oxidized, a portion can diffuse into the membrane. This problem may be addressed by performing an in-situ ion exchange cleaning procedure, or alternatively a pre-treatment step may be employed to remove or reduce these via chemical coagulation-flotation/filter/clarifier, electro-coagulation & flotation/filter/clarifier, lime softening, chemical precipitation, and so on. Further, one or more of the following may be performed to reduce fouling and cleaning requirements: removal of suspended solids, particulate matter, and colloidal particles (e.g. filtering, gravity separation by coagulation, flocculation & clarification), removal or reduction of scale-forming minerals (e.g. lime softening, deionization and ion exchange), and removal of free fats, oil and grease (e.g. coagulation, flotation, and filtration). When metal ion leakage into the cathode is undesirably encountered, the following procedures or modifications may be considered: a purge or flush step of the cathode with deionized water, acid, base, chelating agent, or other cleaning solution, a potentiostatic cleaning procedure, a modification to the ion-exchange membrane to make it more selective for protons with respect to metallic cations, and/or a modification of the cathode catalyst layer and gas diffusion layer to make them more hydrophobic to facilitate cleaning. When sodium ion (Na$^+$) ion leakage into the membrane is undesirably encountered, an in-situ ion exchange cleaning procedure may be performed. And, when sodium ion leakage into the cathode is undesirably encountered, as above a purge or flush step of the cathode with deionized water, acid, base or other cleaning solution may be used. In particular, a deionized water purge that results in formation of sodium hydroxide can provide a valuable by-product which can be recovered. And when oxygen leakage into the cathode is undesirably encountered, MnO$_2$ or other catalyst can be incorporated into the cathode gas diffusion layer and/or catalyst layer in order to decompose hydrogen peroxide. To provide for certain of the preceding cleaning processes, the cell and/or system may, at the cathode side, comprise a drain for cleaning solutions and a valve at the hydrogen gas outlet to prevent solution entering the gas line during cleaning. Drains may be incorporated generally which drain into the wastewater outlet or other general disposal. For clean in place capability, power would be turned off to the cell or cells, and a valve at the wastewater inlet employed to bypass the wastewater and to hook up a cleaning solution line. A valve at the exit may be employed in order to collect the cleaning solution. A similar process could be used on the hydrogen line.

One of ordinary skill in the art can be expected to appreciate the factors involved and to be able to determine what is adequate and how to adjust parameters such as flow rates, etc. accordingly. As shown in the Examples, model wastewater can be treated without fouling the cell electrodes. Oxygen evolution on the anode side due to water electrolysis as a side reaction can help keep the electrode free from any organic film buildup. However, in other situations, occasional cleanup of the electrodes may be required and accomplished by temporary cell reversals or other techniques known to those in the art.

The advantages of the present methods and systems are numerous. Primarily, they offer improved energy efficiency in the treatment of polluted wastewater. No solid waste or sludge is produced, nor toxic by-product gases which otherwise would need to be treated later. No catholyte is employed at the cathode, no fresh water is needed to generate hydrogen, and no waste is produced there. Thus, no additional chemicals need be added nor later removed to accomplish treatment. The system is versatile and can effectively treat effluents from industrial and municipal wastewaters and can mineralize many pollutants and microorganisms under the same operating conditions, thus combining organic pollutant removal and disinfection in a single step. Fundamentally, a wide operating range of temperatures, pressures, and variable effluent flow rates may be used. The system is scaleable and can be considered for treatment of wastewater quantities ranging from milliliters to millions of liters. The electrolytic cell components are suitable for low cost, high volume manufacturing processes and/or are already being mass produced. Along with low cost construction, operating costs and energy consumption are low, especially considering the possible capture of high purity by-product hydrogen for energy recovery, or use in other industrial operations.

The following examples are provided to illustrate certain aspects of the invention but should not be construed as limiting in any way.

EXAMPLES

Numerous laboratory scale solid polymer electrolyte electrolytic cells were constructed as shown generally in FIG. 2 and were used to remove contaminants from wastewater samples via the method of the invention. The contaminants removed were either Acid Blue 29, phenol, acetaminophen, ibuprofen, Kraft mill effluent, or formic acid and these were present in different concentrations as indicated below.

The test electrolytic cells all employed a single membrane electrode assembly (MEA) comprising fluid and gas distribution layers adjacent to each of the anode and cathode electrodes. The fluid distribution layers were made of various porous carbon papers on which various microporous sublayers had been applied (as indicated below) and niobium mesh with a tungsten gauze sublayer. In some cases, commercially obtained MEAs were used and in other cases, catalyst layers comprising special catalyst compositions were prepared and applied to the fluid distribution layers (again as indicated below). The MEAs with fluid diffusion layers were clamped between graphite resin composite plates in which serpentine flow field channels had been machined. The size of the MEA varied somewhat from cell to cell as indicated below, but was of order of 50 cm' in size.

In these laboratory scale tests, several thicknesses of porous graphite paper from Toray were used as substrates for the fluid diffusion layers (i.e. Toray™ TGP-H-030=110 μm, TGP-H-60=190 μm, TGP-H-90=280 μm, TGP-H-120=370 μm). The papers were impregnated with PTFE using multiple successive conventional dip or flow techniques to build up the thickness of the PTFE coating slowly without forming cracks. Each coating layer was dried to remove water at 80° C. The PTFE impregnated substrate was either sintered at 400° C. for 10 minutes to increase the hydrophobicity of the surface before applying the microporous sublayer coatings, or was left unsintered to allow for controlled penetration of microporous coating solution.

Microporous sublayer coatings were then applied to the fluid diffusion layer substrates. Suspensions of electrically conductive particles and hydrophobic PTFE were prepared in solutions comprising water, wetting agent, and pore formers as indicated in Table 1 below. First, the electrically conducting particles were suspended in water and wetting agent by dispersing/mixing at 1500 rpm for 5 minutes. Then, the PTFE and pore former in water were added and mixed at 2500 rpm using a high shear mixer for 30 minutes or longer until no agglomeration is present (determined by fineness of grind gage). The sublayer suspension was then applied to the substrates either by rod or blade coating. The coated substrates were heated to remove water and then were calendared. Finally, both the wetting agent and pore former were removed and the applied PTFE was sintered by heating the coated substrates for 10 minutes at 400° C. Table 1 below summarizes the various sublayer compositions of the 8 different sublayers appearing in these Examples. Sublayer #s 4, 5, and 6 had the same composition and were made in the same manner but were applied in different amounts to the substrates involved.

TABLE 1

| Sublayer # | Electrically conducting particles | Hydrophobic PTFE | Pore former and rheology modifier | Wetting Agent |
|---|---|---|---|---|
| 1 | 5 wt. % Super P-Li ™ carbon black | 2 wt. % | 3 wt. % HPMC + 90 wt. % H$_2$O | 0.15 wt. % Tergitol ™ |
| 2 | 5 wt. % Timrex HSAG300 graphite ™ | 1 wt. % | 1 wt. % HPMC + 92.8 wt. % H$_2$O | 0.2 wt. % Tergitol ™ |
| 3 | 2.5 wt. % Timrex KS150 ™ + 2.5 wt. % KS25 ™ graphite | 1 wt. % | 1 wt. % HPMC + 92.4 wt. % H$_2$O | 0.6 wt. % Tergitol ™ |
| 4, 5, 6 | 5 wt. % Timrex KS25 ™ graphite | 1 wt. % | 1 wt. % HPMC + 92.6 wt. % H$_2$O | 0.4 wt. % Tergitol ™ |
| 7 | 5.5 wt. % Timrex KS25 ™ graphite | 2 wt. % | 1 wt. % HPMC + 91 wt. % H$_2$O | 0.5 wt. % Tergitol ™ |
| 8 | 3.5 wt. % Timrex KS25 ™ graphite + 1.5 wt. % MnO$_2$ | 2 wt. % | 1 wt. % HPMC + 91.5 wt. % H$_2$O | 0.5 wt. % Tergitol ™ |
| 9 | 5 wt. % Niobium | 1 wt. % | 1 wt. % HPMC + 92.6 wt. % H$_2$O | 0.4 wt. % Tergitol ™ |

Notes:
Timrex HSAG300 ™ graphite has a particle size distribution with 90% <32 μm, and a surface area = 280 m$^2$/g
Super P-Li ™ conductive carbon black has 40 nm particle size and a surface area of 62 m$^2$/g
Timrex KS150 synthetic graphite has a particle size distribution with 95% <180 μm
Timrex KS25 synthetic graphite has a particle size distribution with 90% <27.2 μm and a surface area of 12 m$^2$/g
MnO$_2$ powder has <5 μm particle size distribution
HPMC stands for hydroxypropyl methylcellulose
>95% of niobium was −325 mesh powder Nine different anode catalyst layers (denoted A1 to A9) and five different cathode catalyst layers (denoted C1 to C5) appear in these Examples. The various catalyst layer and preparation suspension compositions are summarized in Table 2 below. A1 and C1 were commercially obtained platinum catalyst layers coated on a membrane electrolyte which were provided as a complete catalyst coated membrane (CCM) product from Ion Power, Inc. and thus do not appear in Table 2. The catalyst layers appearing in Table 2 were applied in the form of a suspension to the sublayer coated fluid diffusion layers or membrane electrolytes as indicated in Tables 4-7 below. The suspensions were prepared by adding the indicated catalyst and electrical conductor powder to a liquid carrier. The suspension was mixed at 2500-3500 rpm for about 30 minutes after which the proton conductor (electrolyte) was added and mixed further at 2500 rpm for 15 minutes. The catalyst coating suspension was then sparingly sprayed using multiple passes onto each surface of the membrane (CCM) or onto the fluid distribution layer and cathode gas diffusion layer (electrodes) using an air-powered, gravity-fed spray gun. The coating was dried between passes until the desired coating weight was reached.

TABLE 2

| Catalyst Layer | Electrocatalyst | Electron Conductor | Liquid Carrier | Proton Conductor |
|---|---|---|---|---|
| A2 | 3.0 wt. % ATO(1) | 0.3 wt. % Silver +0.3 wt. % Super P-Li ™ carbon black | 40.0 wt. % Isopropanol + 56.4 wt. % H2O | none |
| A3, A6 | 2.5 wt. % ATO(1) | 0.25 wt. % Timrex HSAG 300 ™ graphite | 50 wt. % Isopropanol + 53.75 wt. % H2O | 1 wt. % EW1100 Nafion ™ |
| A4 | 2.5 wt. % ATO(2) | 0.25 wt. % Timrex HSAG 300 ™ graphite | 50 wt. % Isopropanol + 53.75 wt. % H2O | 1 wt. % EW1100 Nafion ™ |
| A5 | 1.0 wt. % ATO(3) + 0.25 wt. % Platinum | 0.4 wt. % carbon support and 1.5 wt. % HSAG300 ™ graphite support | 20 wt. % Isopropanol + 75.85 wt. % H2O | 1 wt. % EW1100 Nafion ™ |
| A7 | 2.0 wt. % ATO(1) + 0.5 wt. % MnO2 + 0.75 wt. % SnO2 | 0.25 wt. % Sn—Ag | 25 wt. % Isopropanol + 70.5 wt. % H2O | 1.0 wt. % EW1100 Nafion ™ |
| A8 | 2.0 wt. % ATO(2) | 0.5 wt. % Ta and 0.5 wt. % Nb and 0.5 wt. % TiC | 25 wt. % Isopropanol + 70.5 wt. % H2O | 1.0 wt. % EW1100 Nafion ™ |
| A9 | 1.0 wt. % ATO(2) + 1.0 wt. % ATO(4) | 0.25 wt. % Timrex HSAG 300 ™ graphite | 25 wt. % Isopropanol + 70.5 wt. % H2O | 1.0 wt. % EW1100 Nafion ™ |
| C2, C3, C4 | 1.5 wt. % Platinum | 2.0 wt. % carbon support | 25 wt. % Isopropanol + 70.5 wt. % H2O | 1.0 wt. % EW1100 Nafion ™ |

TABLE 2-continued

| Catalyst Layer | Electrocatalyst | Electron Conductor | Liquid Carrier | Proton Conductor |
|---|---|---|---|---|
| C5 | 1.5 wt. % Pt + 0.5 wt. % MnO2 | 2.0 wt. % carbon support | 20 wt. % Isopropanol + 75 wt. % H2O | 1.0 wt. % EW1100 Nafion ™ |

Notes:
ATO(1) stands for antimony tin oxide nanoparticles; ratio of $Sb_2O_5$:$SnO_2$ is 10:90 wt %; 22-44 nm particle size; and surface area of 20-40 $m^2/g$
ATO(2) was ATO(1) which had been heat treated for 4 hours at 550° C. in air
ATO(3) was antimony tin oxide decorated Timrex HSAG300 ™ graphite
ATO(4) was Nb and Sb doped tin oxide particles; $Nb_2O_5$:$Sb_2O_5$:$SnO_2$, nominal ratio 5:10:85 wt. %
The platinum used was HiSPEC 4100 ™; nominally 40% by weight on carbon support
Timrex HSAG300 ™ graphite is a conductive, high surface area graphite having a particle size distribution in which 90% <32 μm; and a surface area of 280 $m^2/g$
Super P-Li ™ was a conductive carbon black; with 40 nm particle size; and a surface area of 62 $m^2/g$
The silver used was a spherical powder, 99.9%(metals basis), having a particle size distribution of 1.3-3.2 μm; and a surface area of 0.3-0.7 $m^2/g$
MnO2 powder had <5 μm particle size distribution
Sn—Ag was an alloy nanopowder, with <150 nm particle size, 3.5% Ag
$SnO_2$ was −325 mesh powder
Nafion ™ EW1100 was a dispersion comprising colloidal particles in a 10 wt. % solution
Ta was −325 mesh powder
Nb was −325 mesh powder
TiC powder had ≤4 μm particle size distribution Further, in the above, the ATO(3) was prepared by dissolving 9.5 μm $SnCl_2$-$2H_2O$ and 0.5 μm $SbCl_3$ in 10 ml concentrated HCl acid. The mixture was stirred until the solution was clear. 10 μm of pre-treated Timrex HSAG300™ graphite was then dispersed in 100 ml ethanol. This graphite suspension was heated to 80-90° C. and the acid solution was added slowly while continuing to stir. Heating and stirring continued until the ethanol evaporated. The powder product was filtered and washed with de-ionized water and then dried in an oven at 100° C. In this procedure the Timrex HSAG300™ had been pre-treated by first combining 0.25 μm $PdCl_2$, 12.5 μm $SnCl_2$-$2H_2O$, 150 ml de-ionized water, and 75 ml concentrated HCl acid, stirring at room temperature until green in colour (≥1 hr), then adding 20 μm of the graphite powder to this suspension, stirring for 1-3 minutes, and finally filtering, rinsing and drying the powder The test MEAs comprising the fluid diffusion layers were bonded together into unitary assemblies before testing. When employing commercially obtained and in-house manufactured catalyst coated membrane electrolytes, these were placed between an appropriate anode fluid distribution layer and cathode fluid distribution layer (henceforth referred to as cathode gas diffusion layer because the fluid at the cathode side was always gaseous) and were either hot pressed at 140° C. for 5 minutes or left un-bonded for testing. When employing the catalyst coated fluid diffusion layers described herein, these electrodes were placed on either side of a commercially obtained membrane electrolyte and hot pressed at 140° C. for 5 minutes to bond them together. PTFE tape was used to mask the edges of un-bonded CCMs to provide a dimensionally stable perimeter for the cell assembly.

The compositions and loadings of the various catalyst layers and fluid distribution layers used in the MEAs in these Examples are summarized in Table 3 below.

TABLE 3

| MEA | Anode fluid distribution layer | Anode Catalyst Layer[a] | Membrane | Cathode catalyst layer[b] | Cathode gas diffusion layer |
|---|---|---|---|---|---|
| A | Substrate: TGP60 + 10 wt. % PTFE<br>Microporous layer #1: 6 gm/$m^2$ carbon black + 25 wt. % PTFE | #A1-0.3 mg/$cm^2$ Pt | Nafion ™ XL100 | #C1-0.3 mg/$cm^2$ Pt | Substrate: TGP60 + 10 wt. % PTFE<br>Microporous layer #1: 6 gm/$m^2$ carbon black + 25 wt. % PTFE |
| B | Substrate: TGP90 + 10 wt. % PTFE<br>Microporous layer #2: 6.5 gm/$m^2$ graphite + 15 wt. % PTFE | #A1-0.3 mg/$cm^2$ Pt | Nafion ™ XL100 | #C1-0.3 mg/$cm^2$ Pt | Substrate: TGP90 + 10 wt. % PTFE<br>Microporous layer #2: 6.5 gm/$m^2$ graphite + 15 wt. % PTFE |
| C | Substrate: TGP90 + 10 wt. % PTFE<br>Microporous layer #3: 10 gm/$m^2$ graphite + 15 wt. % PTFE | #A2-4.5 mg/$cm^2$ ATO(1) + 25 wt. % Ag + 20 wt. % PTFE | Nafion ™ N211 | #C2-1 mg/$cm^2$ Pt + 30 wt. % Nafion ™ | Substrate: TGP120 + 10 wt. % PTFE<br>Microporous layer #3: 10 gm/$m^2$ graphite + 15 wt. % PTFE |
| D | Substrate: TGP60 + 10 wt. % PTFE<br>Microporous layer #4: 20 gm/$m^2$ graphite + 15 wt. % PTFE | #A3-2.5 mg/$cm^2$ ATO(1) + 10 wt. % HSAG300 + 30 wt. % Nafion ™ | Nafion ™ N211 | #C2-1 mg/$cm^2$ Pt + 30 wt. % Nafion ™ | Substrate: TGP60 + 10 wt. % PTFE<br>Microporous layer #4: 20 gm/$m^2$ graphite + 15 wt. % PTFE |
| E | Substrate: TGP60 + 10 wt. % PTFE<br>Microporous layer #4: 20 gm/$m^2$ graphite + 15 wt. % PTFE | #A4-2.5 mg/$cm^2$ ATO(2) + 10 wt. % HSAG300 + 30 wt. % Nafion ™ | Nafion ™ XL100 | #C3-1.5 mg/$cm^2$ Pt − 30 wt. % Nafion ™ | Substrate: TGP60 + 10 wt. % PTFE<br>Microporous layer #4: 20 gm/$m^2$ graphite + 15 wt. % PTFE |
| F | Substrate: TGP120 + 10 wt. % PTFE<br>Microporous layer #3: 10 gm/$m^2$ graphite + 15 wt. % PTFE | #A4-2.5 mg/$cm^2$ ATO(2) + 10 wt. % HSAG300 + 30 wt. % Nafion ™ | Nafion ™ XL100 | #C1-0.3 mg/$cm^2$ Pt | Substrate: TGP120 + 20 wt. % PTFE<br>Microporous layer #6: 20 gm/$m^2$ graphite + 30 wt. % PTFE |

TABLE 3-continued

| MEA | Anode fluid distribution layer | Anode Catalyst Layer[a] | Membrane | Cathode catalyst layer[b] | Cathode gas diffusion layer |
|---|---|---|---|---|---|
| F1 | Substrate: TGP120 + 10 wt. % PTFE<br>Microporous layer #3: 10 gm/m$^2$ graphite + 15 wt. % PTFE | #A4-2.5 mg/cm$^2$ ATO(2) + 10 wt. % HSAG300 + 30 wt. % Nafion ™ | Nafion ™ XL100 | #C1-0.3 mg/cm$^2$ Pt | Substrate: TGP120 + 20 wt. % PTFE<br>Microporous layer #8: 15 gm/m$^2$ graphite + 5 g/m$^2$ MnO$_2$ + 30 wt. % PTFE |
| G | Microporous layer #3: 10 gm/m$^2$ graphite + 15 wt. % PTFE<br>Microporous layer #3: 10 gm/m$^2$ graphite + 15 wt. % PTFE | #A5-2.5 mg/cm$^2$ ATO(1) + 20 wt. % Pt + 30 wt. % Nafion ™ | Nafion ™ XL00 | #C4-1.5 mg/cm$^2$ Pt + 30 wt. % Nafion ™ | Microporous layer #6: 20 gm/m$^2$ graphite + 30 wt. % PTFE<br>Microporous layer #3: 10 gm/m$^2$ graphite + 15 wt. % PTFE |
| H | Substrate: TGP60 + 10 wt. % PTFE<br>Microporous layer #3: 10 gm/m$^2$ graphite + 15 wt. % PTFE | #A4-2.5 mg/cm$^2$ ATO(2) + 10 wt. % HSAG300 + 30 wt. % Nafion ™ | Nafion ™ NR211 | #C4-1.5 mg/cm$^2$ Pt + 30 wt. % Nafion ™ | Substrate: TGP60 + 10 wt. % PTFE<br>Microporous layer #6: 20 gm/m$^2$ graphite + 15 wt. % PTFE |
| I | Substrate: TGP30 + 10 wt. % PTFE<br>Microporous layer #3: 10 gm/m$^2$ graphite + 15 wt. % PTFE | #A3-2.5 mg/cm$^2$ ATO(1) + 10 wt. % HSAG300 + 30 wt. % Nafion ™ | Nafion ™ XL100 | #C1-0.3 mg/cm$^2$ Pt | Substrate: TGP30 + 10 wt. % PTFE<br>Microporous layer #3: 10 gm/m$^2$ graphite + 15 wt. % PTFE |
| J | Substrate: TGP60 + 10 wt. % PTFE<br>Microporous layer #5: 15 gm/m$^2$ graphite + 15 wt. % PTFE | #A5-2.5 mg/cm$^2$ ATO(3) + 20 wt. % Pt + 30 wt. % Nafion ™ | Nafion ™ N211 | #C4-1.5 mg/cm$^2$ Pt + 30 wt. % Nafion ™ | Substrate: TGP60 + 40 wt. % PTFE<br>Microporous layer #7: 10 gm/m$^2$ graphite + 30 wt. % PTFE |
| K. K2 | Substrate: TGP120 + 10 wt. % PTFE<br>Microporous layer #3: 10 gm/m$^2$ graphite + 15 wt. % PTFE | #A6-5 mg/cm$^2$ ATO(1) + 10 wt. % HSAG300 + 30 wt. % Nafion ™ | Nafion ™ XL100 | #C4-1.5 mg/cm$^2$ Pt + 30 wt. % Nafion ™ | Substrate: TGP120 + 10 wt. % PTFE<br>Microporous layer #4: 20 gm/m$^2$ graphite + 15 wt. % PTFE |
| L | Substrate: TGP120 + 10 wt. % PTFE<br>Microporous layer #3. 10 gm/m$^2$ graphite + 15 wt. % PTFE | #A7-1.1 mg/cm$^2$ ATO(1) + 0.25 mg/cm$^2$ MaO$_2$ + 25 wt. % SaO$_2$ + 10 wt. % Sn—Ag + 30 wt. % Nafion ™ | Nafion ™ XL100 | #C2-1 mg/cm$^2$ Pt + 30 wt. % Nafion ™ | Substrate: TGP120 + 30 wt. % PTFE<br>Microporous layers #7: 10 gm/m$^2$ graphite + 30 wt. % PTFE |
| M | Nb gauze-40 mesh 17.8 cm dia. wire-<br>W gauze-100 mesh 2.54 cm dia. wire | #A7-1.1 mg/cm$^2$ ATO(1) + 0.25 mg/cm$^2$ MnO$_2$ + 25 wt. % SnO$_2$ + 10 wt. % Sn—Ag + 30 wt. % Nafion ™ | Nafion ™ XL100 | #C2-1 mg/cm$^2$ Pt + 30 wt. % Nafion ™ | Substrate: TGP120 + 30 wt. % PTFE<br>Microporous layer #7: 10 gm/m$^2$ graphite + 30 wt. % PTFE |
| N | Substrate: TGP120 + 10 wt. % PTFE<br>Microporous layer #3: 10 gm/m$^2$ graphite + 15 wt. % PTFE | #A8-0.6 mg/cm$^2$ ATO(2) + 0.15 mg/cm$^2$ Nb + 0.15 mg/cm$^2$ Ta + 0.15 mg/cm$^2$ TiC | Nafion ™ XL100 | #C2-1 mg/cm$^2$ Pt + 30 wt. % Nafion ™ | Substrate: TGP120 + 30 wt. % PTFE<br>Microporous layer #8: 15 gm/m$^2$ graphite + 5 g/m$^2$ MnO$_2$ + 30 wt. % PTFE |
| O | Substrate: Graphite felt<br>No Microporous layer | #A7-1.1 mg/cm$^2$ ATO(1) + 0.25 mg/cm$^2$ MnO$_2$ + 25 wt. % SnO$_2$ + 10 wt. % Sn—Ag + 30 wt. % Nafion ™ | Nafion ™ XL100 | #C2-1 mg/cm$^2$ Pt + 30 wt. % Nafion ™ | Substrate: TGP60 + 30 wt. % PTFE<br>Microporous layer #4: 20 gm/m$^2$ graphite + 15 wt. % PTFE |
| P | Substrate: Niobium screen<br>Microporous layer #9: 10 gm/m$^2$ niobium + 15 wt. % PTFE | #A9-2.5 mg/cm$^2$ ATO(2) + 2.5 mg/cm$^2$ ATO(4) + 10 wt. % HSAG300 + 30 wt. % Nafion ™ | Nafion ™ XL100 | #C2-1 mg/cm$^2$ Pt + 30 wt. % Nafion ™ | Substrate: TGP60 + 30 wt. % PTFE<br>Microporous layer #4: 20 gm/m$^2$ graphite + 15 wt. % PTFE |
| Q | Substrate: TGP120 + 20 wt. % PTFE<br>Microporous layer #7: 10 gm/m$^2$ graphite + 30 wt. % PTFE | #A9-2.5 mg/cm$^2$ ATO(2) + 2.5 mg/cm$^2$ ATO(4) + 10 wt. % HSAG300 + 30 wt. % Nafion ™ | Nafion ™ XL100 | #C2-1 mg/cm$^2$ Pt + 30 wt. % Nafion ™ | Substrate: TGP120 + 20 wt. % PTFE<br>Microporous layer #7: 10 gm/m$^2$ graphite + 30 wt. % PTFE |

[1]Unless otherwise indicated, the substrate with PTFE was not sintered before sublayer coating The electrochemical cell assembly was completed by sandwiching the test MEAs between anode and cathode flow field plates made of polymer-graphite composite. A 4 pass serpentine channel had been machined in the cathode flow field plate with a 1 mm channel width, 1 mm channel height, 1 mm landing width and a geometric area of 50 cm$^2$. Two different anode flow field plates were used; the first having a 4 pass serpentine channel machined in the flow field plate with a 1 mm channel width, 1 mm channel height, 1 mm landing width and a geometric area of 50 cm$^2$, and the second having a single channel machined therein with a 5 mm channel width, 8 mm channel height, 2 mm landing width, and a geometric area of 50 cm$^2$. A spiral in-line mixing component, manufactured from twisted PTFE tape, 2 mm in width, was used with the single channel anode flow field plate and the channel interior was coated with PTFE. The sealing gaskets used were made of Viton® and Gore®, the current collectors were gold coated copper, and the end compression plates were made of steel and contained interior electrical resistance heating elements. In all the experimental tests below, the 4 pass channel design was used except for the test involving MEA K2 in Table 5 which used the single channel and in-line mixing component.

Testing then involved preparing model contaminated wastewaters (>1 L of solution) with the specified pollutant in de-ionized water. The electrochemical cell temperature was kept constant using the internal resistive heating elements, a temperature controller, and thermocouple. Several test temperatures were used as indicated below. Wastewater comprising the indicated contaminant was then flowed through the anode of the test cell using a peristaltic pump at a rate of 270 mL/hour while a constant DC voltage was applied to the current collectors. The valve downstream from the anode exhaust was used in selected trials to provide pressurized flow. The cathode inlet of the test cell was sealed and the cathode exhaust was also provided with a valve downstream to provide slightly pressurized hydrogen gas exhaust. The majority of tests were run at atmospheric pressure at the anode exhaust and slight pressure (<1 psi) at the cathode exhaust as a result of filling the hydrogen storage container. No water or purge gases were used or required on the cathode. No supporting electrolyte of any kind was used at the cathode in any test. The wastewater effluent was collected in a plastic jug and the product gases were released to the atmosphere.

Tables 4, 5, 6, 7, 8 and 9 below summarize the results obtained for the tests involving Acid Blue 29 dye, phenol, acetaminophen, formic acid, ibuprofen, and Kraft effluent respectively.

In the case of the Acid Blue 29 dye pollutant, colour measurements were used to quantify the efficacy of treatment. The % of colour removal was determined with a UV/VIS Spectrophotometer by comparing absorbance against samples of known concentrations.

Figure 4:
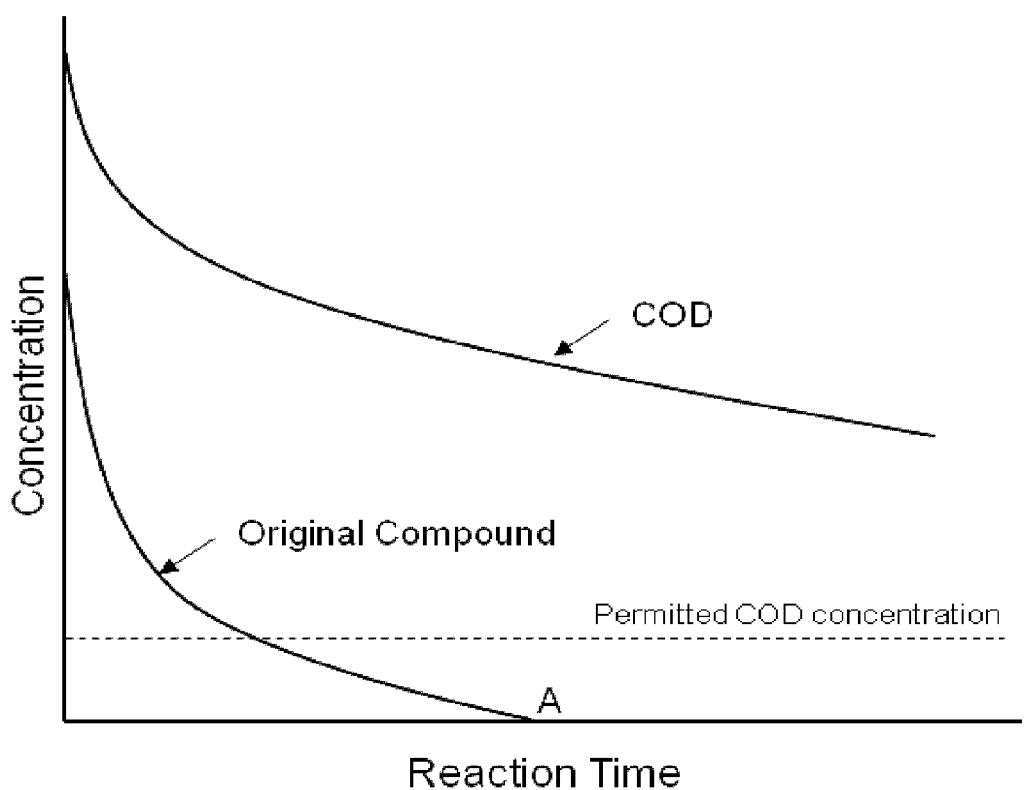
FIG. 4 is a qualitative prior art illustration showing how the change in original compound concentration can differ from that of the COD over the course of oxidation for refractory organic compounds such as phenol.

In the case of the other pollutants tested, the chemical oxygen demand (COD) was used to quantify the efficacy of treatment. COD is used as a measurement of pollutants in wastewaters and natural waters. Both organic and inorganic components of a sample are subject to oxidation, but in most cases the organic component predominates and is of the greatest interest (ref. Standard Methods for the Examination of Water and Wastewater, 21$^{st}$ Edition, APHA, AWWA, WEF, ©2005). In general, the oxidation of specific compounds is characterized by the extent of degradation of the final oxidation products (ref: Industrial Water Quality, 4th edition, W. Wesley Eckenfelder, Jr., Davis L. Ford and Andrew J. Englande, Jr. McGraw-Hill Companies, Inc. © 2009). The reason for this is that the degradation of the pollutant can be referred to in several ways. There is: (1) Primary degradation which involves a structural change in the parent compound; (2) Acceptable degradation (defusing) which involves a structural change in the parent compound to the extent that toxicity is reduced; (3) Ultimate degradation (mineralization) which involves conversion of organic carbon to inorganic $CO_2$; and (4) Unacceptable degradation (fusing) which involves a structural change in the parent compound resulting in an increase in toxicity. Any degradation process that does not lead to total mineralization of the organic constituents may potentially form end products that can be more toxic than the original compounds. FIG. 4 is a prior art illustration of how the change in original compound concentration can differ from that of the COD over the course of oxidation for refractory organic compounds such as phenol. Although at point A, the amount of original/parent compound has decreased to zero, the COD of the wastewater does not meet discharge limit for COD concentration.

Therefore, to quantify the pollutant removal efficacy of the system/process, ultimate degradation (mineralization) of the organic compounds is preferably measured by the chemical oxygen demand (COD). COD will report virtually all organic compounds, and is used for monitoring and control of discharges in industrial applications, discharge permits, and for assessing treatment plant performance. COD is a measure of the total quantity of oxidizable components in a sample (e.g. carbon, hydrogen from hydrocarbons, nitrogen, sulfur, and phosphorus) and was measured here by Method 5220 C (EPA approved—Standard Methods for the Examination of Water and Wastewater, 21$^{st}$ edition).

Samples of the treated wastewater were taken throughout the test periods and average values for colour and COD were determined in accordance with the pollutant present. The current across the test cells was generally stable and the average current density was also determined as reported below.

Tables 4 to 9 also list the energy consumption (the product of voltage, average current, and time over all the passes through the cell) per unit volume of wastewater. Where appropriate, the specific energy consumption per unit mass of COD mineralized is also listed.

Further, the hydrogen gas volume produced was measured in each case at the storage device. And from this, the efficiency of $H_2$ electrolysis was determined and listed in the Tables. Under ideal circumstances it requires 39.4 kWh of electricity at normal conditions (25° C. and 1 atm) to make 1 kg of hydrogen. This represents the higher heating value (HHV) of hydrogen, which includes the total amount of energy (thermal and electrical) to disassociate water at normal conditions. System efficiency is calculated by dividing the heating value (HHV) by the real energy input in units of kWh/kg. Industrial electrolyzer efficiencies generally are in the range of 52% to 82% (HHV).

TABLE 4

Colour Removal

| Wastewater Composition | Membrane electrode assembly (MEA)[1] | Temp. (° C.) | Voltage (V) | Current density (mA/cm$^2$) | Pollutant Removal % colour | Energy Consumption (kWh/m$^3$ ww) | Hydrogen Generation Rate (ml/hr) | Efficiency of $H_2$ electrolysis (HHV) |
|---|---|---|---|---|---|---|---|---|
| 60 mg/l Acid blue 29 dye | A | 25 | 1.8 | 6.5 | 95 | 8 | 85 | 55.4 |
| 50 mg/l Acid blue 29 dye | C | 50 | 2.1 | 4 | 95 | 5 | 75 | 62.9 |
| 50 mg/l Add blue 29 dye | C | 50 | 2.1 | 4 | 100 | 11 | 75 | 62.9 |
| 50 mg/l Acid blue 29 dye | D | 50 | 2.6 | 8 | 100 | 15 | 225 | 76.2 |
| 50 mg/l Acid blue 29 dye | G* | 50 | 2.3 | 6 | 95 | 5 | 115 | 58.7 |
| 50 mg/l Acid blue 29 dye | F* | 40 | 2.3 | 3 | 100 | 12 | 45 | 57.4 |
| 50 mg/l Acid blue 29 dye | I | 35 | 2.3 | 2 | 95 | 7 | 25 | 47.8 |
| 50 mg/l Acid blue 29 dye | I | 35 | 2.3 | 2 | 100 | 11 | 25 | 47.8 |
| 100 mg/l Acid blue 29 dye | P | 40 | 5 | 0.5 | 90 | 2 | 5 | 35.2 |

Note:

In Tables 4 to 9, * indicates that the catalyst layer was coated onto fluid and gas distribution layers; all the other MEAs comprise catalyst layers coated onto the membrane. All CCM based MEAs were tested unbounded while the others were tested bonded.

TABLE 5

Phenol Removal

| Nominal Wastewater Composition | Chemical Oxygen Demand (COD mg/L) | Membrane electrode assembly (MEA) | Temp. (° C.) | Voltage (V) | Current density (mA/cm$^2$) | Pollutant Removal % COD | Energy Consumption (kWh/m$^3$ ww) | Specific Energy Consumption (kWh/kg COD) | Hydrogen Generation Rate (ml/hr) | Efficiency of H$_2$ electrolysis (HHV) |
|---|---|---|---|---|---|---|---|---|---|---|
| 500 mg/l phenol | 1227 | B* | 50 | 1.8 | 6.5 | 39 | 16 | 32.4 | not measured | — |
| 330 mg/l phenol | 955 | E* | 35 | 2.3 | 2.5 | 72 | 19 | 27.6 | 30 | 57.4 |
| 500 mg/l phenol | 1258 | F | 35 | 2 | 3 | 65 | 12 | 14.8 | 45 | 66.0 |
| 500 mg/l phenol | 1258 | F | 40 | 2.1 | 4 | 85 | 17 | 16.3 | 55 | 61.5 |
| 500 mg/l phenol | 1258 | F1 | 40 | 2.2 | 4 | 80 | 19 | 18.9 | 60 | 64.0 |
| 330 mg/l phenol | 955 | F* | 35 | 2.3 | 4.5 | 80 | 16 | 21.1 | 65 | 56.8 |
| 1100 mg/l phenol | 2645 | F* | 40 | 2.2 | 4 | 80 | 38 | 18.6 | 55 | 58.7 |
| 2000 mg/l phenol | 5266 | F | 30 | 2.3 | 2.5 | 72 | 42 | 11.2 | 30 | 45.9 |
| 500 mg/l phenol | 1209 | G* | 25 | 2.7 | 4.5 | 40 | 18 | 37.1 | 75 | 48.9 |
| 250 mg/l phenol | 578 | J | 35 | 2.8 | 4 | 70 | 15.5 | 38.3 | 60 | 50.3 |
| 250 mg/l phenol | 578 | K2 | 25 | 2.8 | 5 | 77 | 21 | 46.4 | 75 | 47.1 |
| 1000 mg/l phenol | 2326 | K | 25 | 2.8 | 5 | 65 | 41 | 27.8 | 80 | 50.3 |
| 500 mg/l phenol | 1130 | L | 35 | 2.3 | 1.5 | 70 | 9 | 10.9 | 15 | 45.9 |
| 500 mg/l phenol | 1148 | N | 40 | 2.8 | 2 | 85 | 8.3 | 8.8 | 35 | 55.0 |
| 500 mg/l phenol | 1149 | O | 35 | 2.8 | 2 | 93 | 8.3 | 10 | 35 | 55.0 |
| 250 mg/l phenol | 596 | O | 30 | 2.8 | 1.5 | 95 | 4.8 | 8.5 | 20 | 50.3 |

TABLE 6

Acetaminophen Removal

| Nominal Wastewater Composition | Chemical Oxygen Demand (COD mg/L) | Membrane electrode assembly (MEA) | Temp. (° C.) | Voltage (V) | Current density (mA/cm$^2$) | Pollutant Removal % COD | Energy Consumption (kWh/m$^3$ ww) | Specific Energy Consumption (kWh/kg COD) | Hydrogen Generation Rate (ml/hr) | Efficiency of H$_2$ electrolysis (HHV) |
|---|---|---|---|---|---|---|---|---|---|---|
| 500 mg/l acetaminophen | 1000 | E | 35 | 2.7 | 3 | 89 | 21 | 23.6 | 35 | 57.0 |
| 1 g/l acetaminophen | 1778 | H* | 35 | 2.25 | 4 | 80 | 75 | 52.5 | 70 | 54.8 |

TABLE 7

Formic Acid Removal

| Nominal Wastewater Composition | Chemical Oxygen Demand (COD mg/L) | Membrane electrode assembly (MEA) | Temp. (° C.) | Voltage (V) | Current density (mA/cm$^2$) | Pollutant Removal % COD | Energy Consumption (kWh/m$^3$ ww) | Specific Energy Consumption (kWh/kg COD) | Hydrogen Generation Rate (ml/hr) | Efficiency of H2 electrolysis (HHV) |
|---|---|---|---|---|---|---|---|---|---|---|
| 2 ml/L formic acid | 841 | M | 35 | 2.8 | 2.5 | 85 | 10 | 18 | 35 | 44.0 |
| 2 ml/L formic add | 841 | M | 35 | 2.8 | 2.5 | 95 | 15 | 24 | 35 | 44.0 |

TABLE 8

Ibuprofen Removal

| Nominal Wastewater Composition | Chemical Oxygen Demand (COD mg/L) | Membrane electrode assembly (MEA) | Temp. (° C.) | Voltage (V) | Current density (mA/cm$^2$) | Pollutant Removal % COD | Energy Consumption (kWh/m$^3$ ww) | Specific Energy Consumption (kWh/kg COD) | Hydrogen Generation Rate (ml/hr) | Efficiency of H$_2$ electrolysis (HHV) |
|---|---|---|---|---|---|---|---|---|---|---|
| 0.1 g/l ibuprofen | 383 | Q | 40 | 2.8 | 2 | 80 | 4.3 | 14.4 | 35 | 55.0 |

TABLE 9

Kraft effluent removal

| Nominal Wastewater Composition | Chemical Oxygen Demand (COD mg/L) | Membrane electrode assembly (MEA) | Temp. (° C.) | Voltage (V) | Current density (mA/cm$^2$) | Pollutant Removal % COD | Energy Consumption (kWh/m$^3$ ww) | Specific Energy Consumption (kWh/kg COD) | Hydrogen Generation Rate (ml/hr) | Efficiency of H2 electrolysis (HHV) |
|---|---|---|---|---|---|---|---|---|---|---|
| Kraft pulp & paper mill effluent after biological reactor | 471 | Q | 40 | 2.8 | 2 | 60 | 5.2 | 19.2 | 35 | 44.0 |

The results using these laboratory test cells show that electrochemical cells with non-liquid, polymer electrolytes, that contain no other added chemicals, and comprising low cost catalysts and other electrode components can provide equal or better removal efficiency as comparative prior art systems for recalcitrant Acid Blue 29 dye, phenol, acetaminophen, formic acid, ibuprofen, and Kraft pulp and paper mill effluent. In particular, these results can be obtained with substantially lower energy inputs (i.e. at current densities less than about 10 mA/cm$^2$ and applied voltages less than about 3 V), in some instances with greater than 60% energy reduction at 80% COD removal, with greater than 80% energy reduction at 95% COD removal and this is without including recoverable energy contributions from the hydrogen produced. A 20% increase in current efficiency was observed for Acid Blue dye 29, and over 60% increase for phenol and acetaminophen. Certain specific in-house prepared catalyst choices and electrode designs can lead to >40% improvement in performance.

Figure 5:
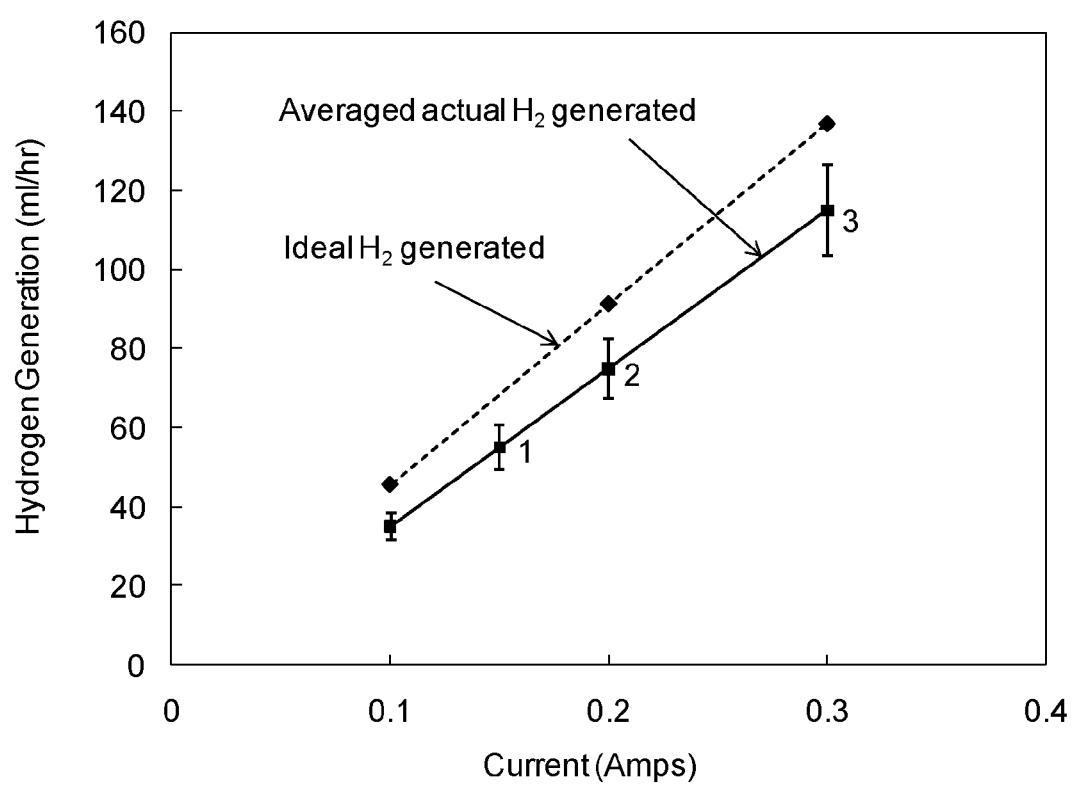
FIG. 5 compares the average actual hydrogen generated from a number of tests performed at several different currents on phenol contaminated wastewater to ideal or perfect hydrogen generation.

Further still however, the inventive method efficiently produces hydrogen at a purity equivalent to commercial electrolyzers and in sufficient amounts such that an estimated additional 15-35% reduction in net energy consumption may be achieved depending on wastewater composition (assuming conversion of hydrogen back to electricity using a fuel cell stack operating at 50% efficiency and assuming 95% of the hydrogen was recovered). For illustrative purposes, FIG. 5 shows the average actual hydrogen generated from a number of tests performed at several different currents on phenol contaminated wastewater compared to ideal or perfect hydrogen generation. As can be seen, there is a high conversion of phenol contaminant to hydrogen.

In addition, the recoverable energy in a realistic scaled industrial system can be estimated based on the above. Assuming state-of the art fuel cells are used to convert the generated hydrogen back into electricity at 50% efficiency, Table 10 shows the expected recoverable energy in an industrial system operating as per the three data points shown in FIG. 5 above. In this Table, the system has been scaled up to treat 1 m$^3$/hr 500 mg/l phenol wastewater, and it is assumed that the hydrogen generated is converted back to electricity with 95% utilization using 5 kW fuel cells operating at 50% efficiency.

TABLE 10

| Operating conditions | Hydrogen generation rate (m$^3$/hr H$_2$) | Recoverable Energy (kWh/m$^3$ wastewater) |
|---|---|---|
| 1$^{st}$ data point in FIG. 5 | 6.7 | 12.5 |
| 2$^{nd}$ data point | 6.9 | 12.9 |
| 3$^{rd}$ data point | 8.5 | 15.9 |

All of the above mentioned U.S. patents and applications, foreign patents and applications and non-patent publications referred to in this specification, are incorporated herein by reference in their entirety.

While particular embodiments, aspects, and applications of the present invention have been shown and described, it is understood by those skilled in the art, that the invention is not limited thereto. Many modifications or alterations may be made by those skilled in the art without departing from the spirit and scope of the present disclosure. The invention should therefore be construed in accordance with the following claims.

What is claimed is:

1. A method for the energy efficient treatment of polluted wastewater comprising:
   providing a solid polymer electrolyte electrolytic cell comprising an anode comprising an anode catalyst layer and the anode catalyst layer comprising an anode catalyst, a cathode comprising a cathode catalyst layer and the cathode catalyst layer comprising a cathode catalyst wherein the cathode is liquid-electrolyte free, and a solid polymer membrane electrolyte separating the anode and the cathode;
   supplying a flow of wastewater comprising a pollutant to the anode of the electrochemical cell;
   providing a voltage less than about 3 volts across the electrolytic cell wherein the anode is positive with respect to the cathode;
   operating the electrolytic cell at an operating temperature and a current density less than about 20 mA/cm2, thereby degrading the pollutant and generating hydrogen gas at the cathode; and
   exhausting the generated hydrogen gas from the cathode.

2. The method of claim 1 comprising operating the electrolytic cell at a current density less than about 10 mA/cm2.

3. The method of claim 1 comprising supplying the flow of wastewater to the anode without an added supporting electrolyte.

4. The method of claim 1 comprising operating the electrolytic cell at an operating temperature in the range from about 3 to 95° C.

5. The method of claim 1 wherein the spacing between the anode and the cathode is less than about 30 micrometers.

6. The method of claim 1 wherein the anode catalyst is selected from the group comprising platinum, tin oxide, antimony tin oxide, niobium doped antimony tin oxide, graphite, and manganese oxide.

7. The method of claim 1 wherein the cathode catalyst is selected from the group comprising platinum, manganese oxide, graphite, and carbon.

8. The method of claim 1 wherein the anode comprises a fluid distribution layer and a microporous sublayer between the anode catalyst layer and the fluid distribution layer.

9. The method of claim 1 wherein the anode comprises a fluid distribution layer comprising niobium mesh and tungsten gauze.

10. The method of claim 1 wherein the cathode comprises a gas diffusion layer and a microporous sublayer between the cathode catalyst layer and the gas diffusion layer.

11. The method of claim 1 wherein the anode catalyst layer additionally comprises carbon or graphite particles having a surface area greater than 280 m2/g.

12. The method of claim 1 wherein the anode catalyst layer additionally comprises Ta, Nb, or TiC particles having a particle size less than 45 microns.

13. The method of claim 1 wherein the pollutant is an organic.

14. The method of claim 13 wherein the pollutant is Acid Blue dye, phenol, acetaminophen, formic acid, ibuprofen or Kraft effluent.

15. The method of claim 1 comprising recovering the exhausted generated hydrogen gas produced at the cathode and converting the hydrogen gas back into electricity.

16. The method of claim 1 comprising a post treatment step for removing free chlorine selected from the group consisting of: reducing electrochemically, adsorbing, decomposing by contacting a transition metal, reacting with a salt, reacting with a chemical reducing agent, reacting with organic matter, decomposing by contacting a redox filter, decomposing by light exposure, and decomposing by heating.

17. The method of claim 1 comprising a step for preventing formation of chlorine selected from the group consisting of: controlling the pH of the wastewater to be greater than about 2, increasing the ionomer concentration at the anode fluid delivery layer, increasing the ionomer concentration at the anode catalyst layer, and incorporating materials that catalyze the decomposition of free chlorine into the anode.

18. The method of claim 1 comprising a cleaning step selected from the group consisting of: ion exchanging in-situ, purging the cathode with a cleaning solution, and potentiostatic cleaning.

* * * * *